June 6, 1967  E. B. BAHNSEN  3,323,848
TOWEL DISPENSING APPARATUS
Filed May 3, 1965  9 Sheets-Sheet 1
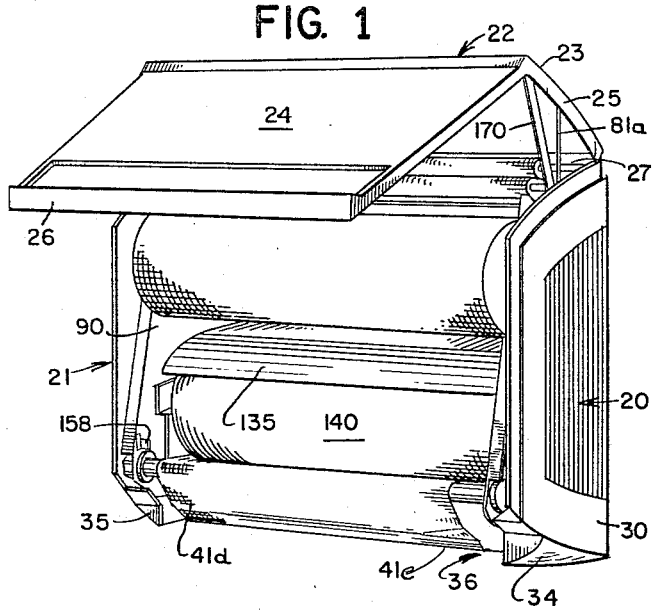
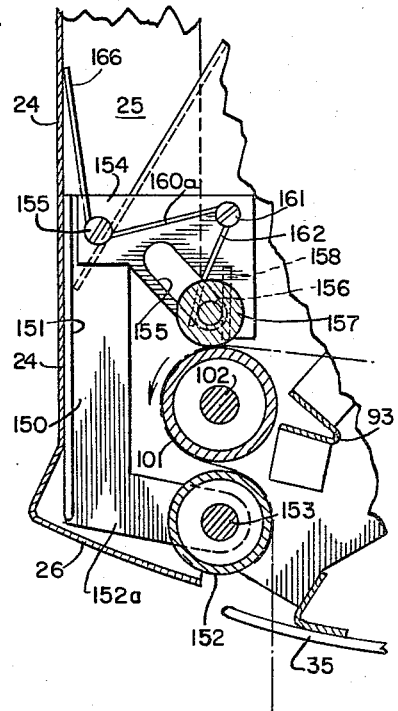
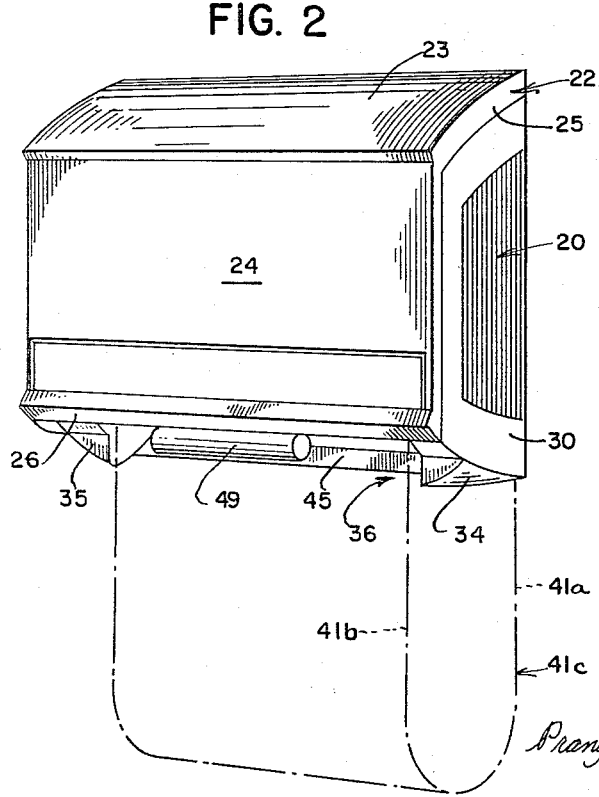
INVENTOR
ERWIN B. BAHNSEN
BY
Prangley, Baird, Clayton, Miller & Vogel
ATTYS.

INVENTOR
ERWIN B. BAHNSEN

June 6, 1967  E. B. BAHNSEN  3,323,848
TOWEL DISPENSING APPARATUS
Filed May 3, 1965  9 Sheets-Sheet 4

INVENTOR
ERWIN B. BAHNSEN
BY
Prangley, Baird, Clayton, Miller & Vogel
ATTYS.

June 6, 1967 E. B. BAHNSEN 3,323,848
TOWEL DISPENSING APPARATUS
Filed May 3, 1965 9 Sheets-Sheet 5
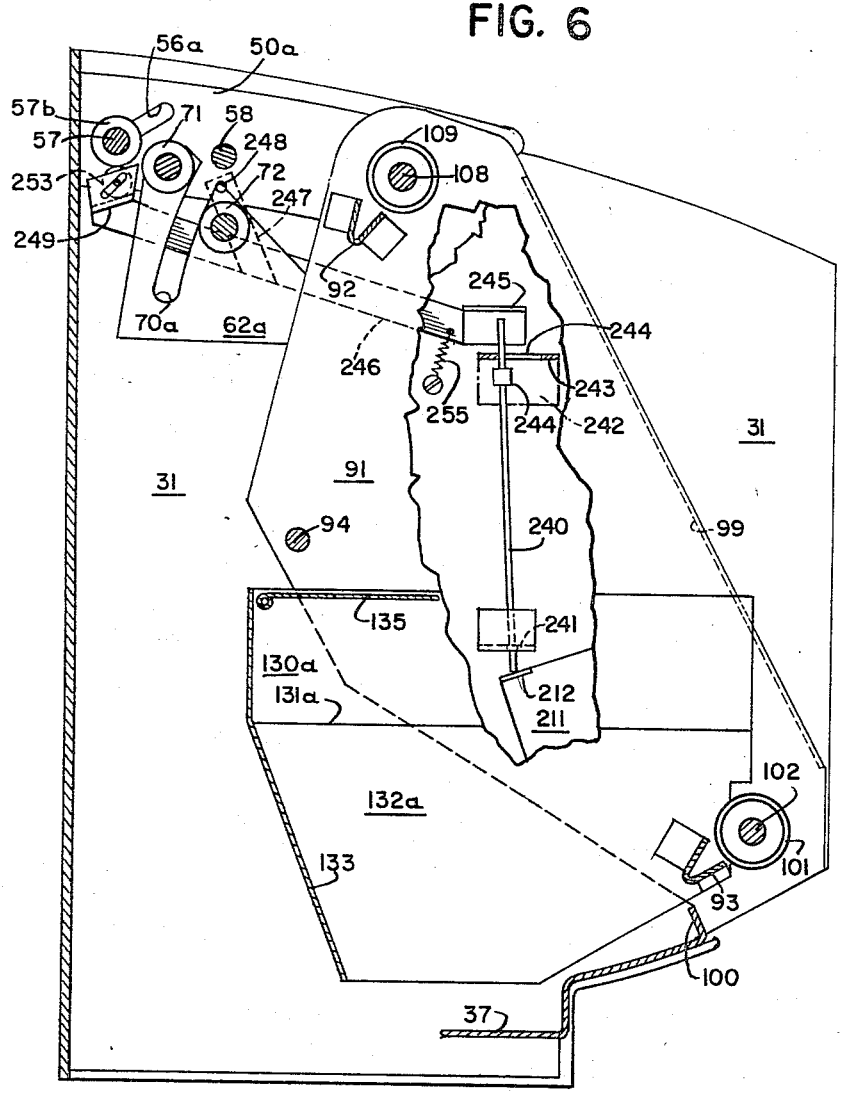
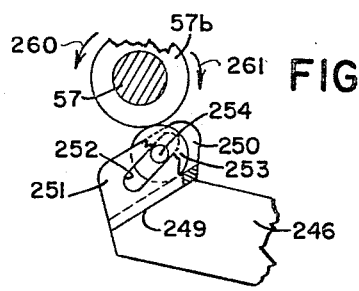
INVENTOR
ERWIN B. BAHNSEN
BY
Prangley, Baird, Clayton, Miller & Vogel.
ATTYS.

June 6, 1967 E. B. BAHNSEN 3,323,848
TOWEL DISPENSING APPARATUS
Filed May 3, 1965 9 Sheets-Sheet 6
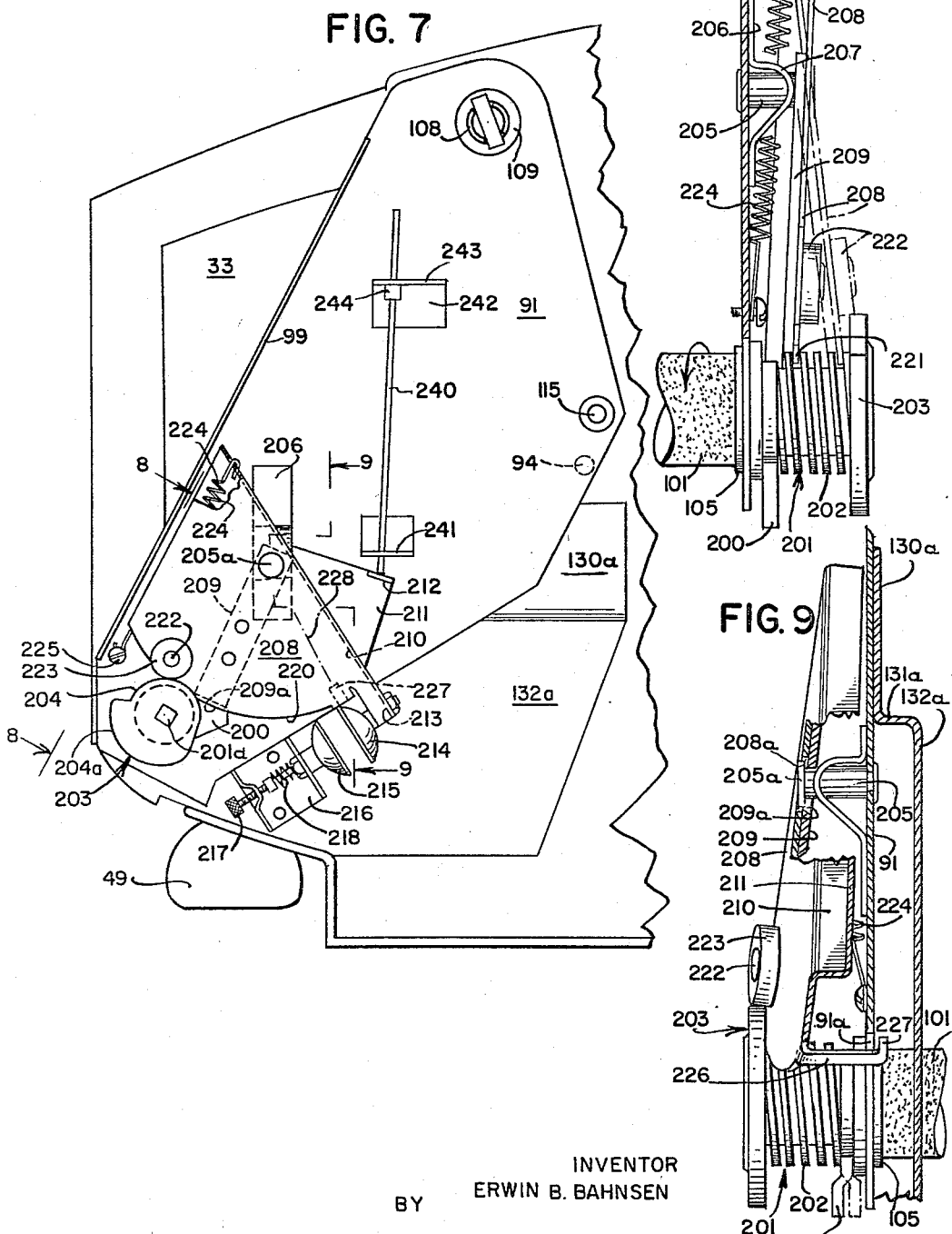
INVENTOR
ERWIN B. BAHNSEN
BY
Prangley, Baird, Clayton, Miller & Vogel
ATTYS.

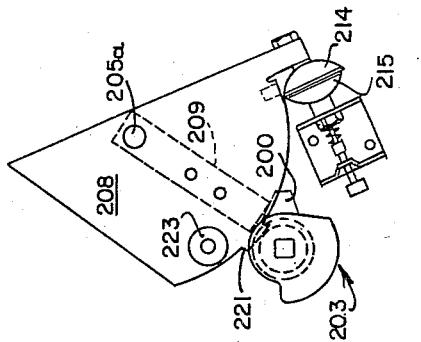
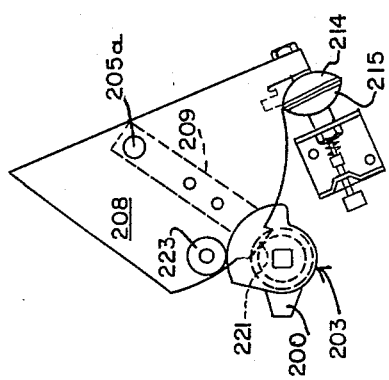
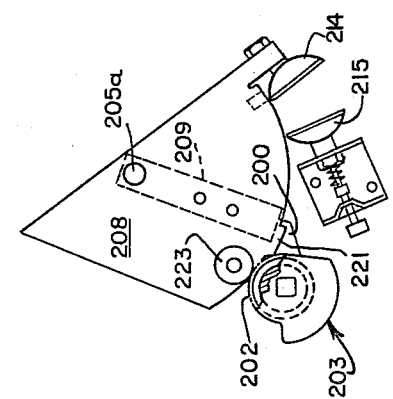

June 6, 1967 E. B. BAHNSEN 3,323,848
TOWEL DISPENSING APPARATUS
Filed May 3, 1965 9 Sheets-Sheet 8

INVENTOR
ERWIN B. BAHNSEN
BY
Prangley, Baird, Clayton, Miller & Vogel
ATTYS.

June 6, 1967 E. B. BAHNSEN 3,323,848
TOWEL DISPENSING APPARATUS
Filed May 3, 1965 9 Sheets-Sheet 9
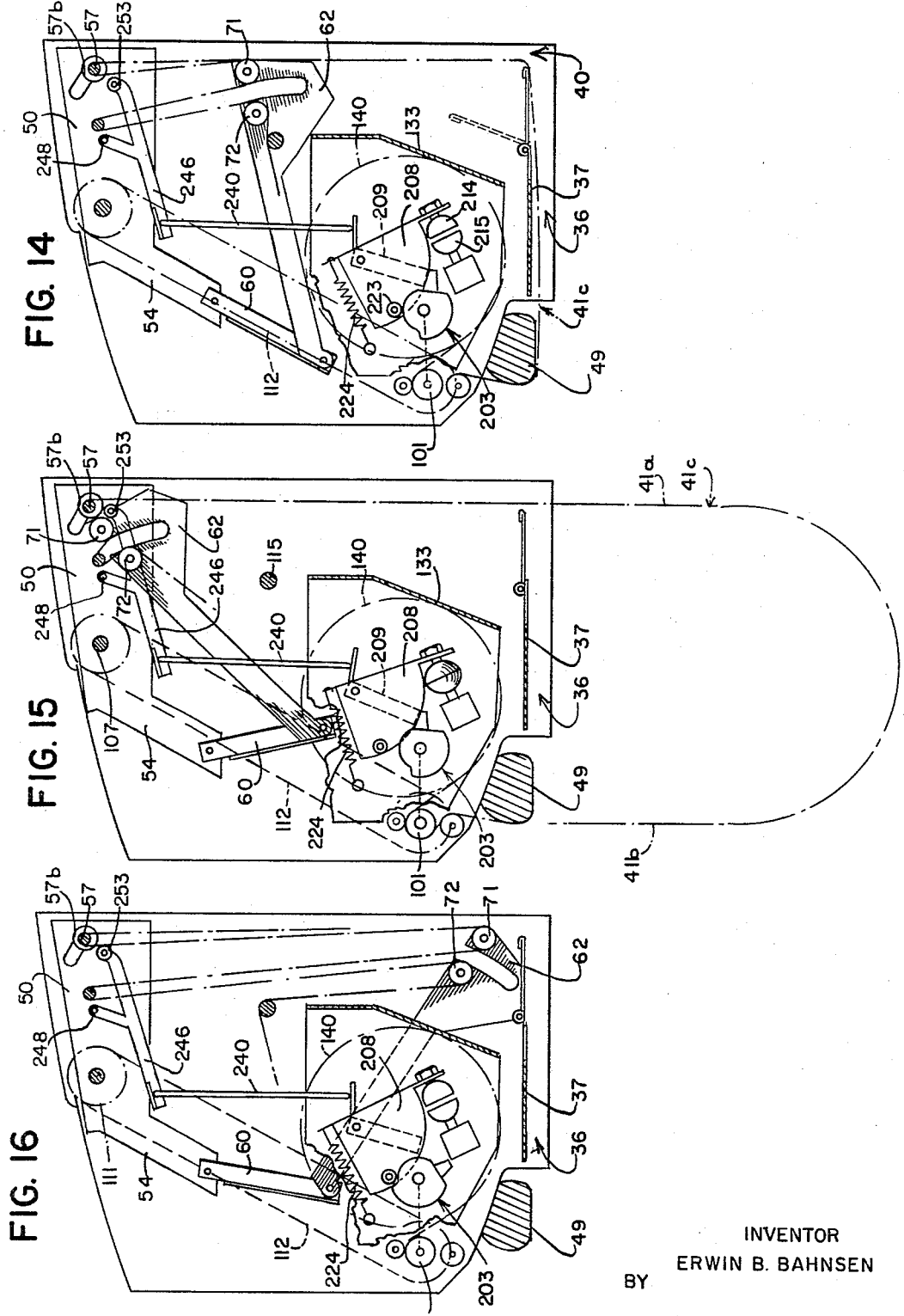
INVENTOR
ERWIN B. BAHNSEN
BY
Prangley, Baird, Clayton, Miller & Vogel.
ATTYS.

United States Patent Office 3,323,848
Patented June 6, 1967

3,323,848
TOWEL DISPENSING APPARATUS
Erwin B. Bahnsen, Hinsdale, Ill., assignor to Steiner American Corporation, Salt Lake City, Utah, a Nevada corporation
Filed May 3, 1965, Ser. No. 452,571
15 Claims. (Cl. 312—38)

The present invention relates generally to improvements in dispensing mechanisms, and more particularly to improvements in the construction and operation of towel dispensers, which improvements are especially well-adapted for use and incorporation in towel dispensers of the continuous type, wherein the toweling is made available to the user in the form of a loop of toweling located, in most cases, beneath the dispenser structure.

It has heretofore been known in towel-dispensing cabinets and dispensers of the continuous-towel type to provide a dispensing cabinet having provided therein a supply roll of clean toweling in which the toweling itself may be as much as 50 yards long. The roll of clean toweling is suitably supported in the dispensing cabinet for rotation or for rolling rotation, so that the clean toweling may be progressively fed from the roll thereof. In such dispensers the clean toweling is commonly fed out of the front portion of the cabinet into a toweling loop which hangs beneath the cabinet structure, the front or forward leg of the loop presenting toweling to the user in what may be considered a use position, with the loop having a rear leg which extends upwardly into the dispenser cabinet structure and passes upwardly therein through a suitable opening provided in the bottom of the cabinet adjacent its rear. An example of such prior dispensers may be seen in the U.S. patent to R. G. Birr, No. 2,899,251. In that representative prior dispenser, the clean toweling is led over a measuring roll within the dispenser cabinet, thence around a pinch roll, and then out of the forward side of the cabinet into the front leg of the depending towel loop. In most of the prior towel dispensers of the type just referred to, the clean toweling, from the supply thereof, is withdrawn from the cabinet by the operator who grips the forward leg of the depending loop and pulls downwardly thereon. As the length of the clean toweling is fed out of the cabinet and into the front leg of the loop, other mechanism within the cabinet simultaneously winds up a substantially equal length of the soiled toweling from the rear leg of the loop. In this manner, the depending toweling loop beneath the dispenser is sought to be maintained at substantially a constant length.

In prior toweling dispensers of the kind just referred to, it will be understood that, after a user has withdrawn a length of toweling from the cabinet and has dried his hands thereon, he leaves exposed, at the front portion of the depending loop, that part of the toweling which he has just used. Thus, the soiled portion of the toweling just used remains in the loop is the position at which the next user of the toweling will grip the towel per se, for the purpose of withdrawing a new length of toweling. Those portions of the toweling loop used by still earlier users contitute the remaining portions of the depending loop. Thus, for the most part, substantially the entirety of the depending loop of toweling is soiled and in an unsanitary condition.

The depending towel loops in the prior dispensers present an unpleasant appearance because of their soiled condition, and some health authorities have objected to the public use of towel dispensers of the kind just referred to, because subsequent users may grip and handle a portion of the depending towel loop which has previously been soiled. Because the entire front leg of the depending towel loop is readily available to the user in such prior continuous towel dispensers, the user may grip a soiled portion of the front leg preparatory to withdrawing a fresh length of clean toweling from the dispenser, and, in some cases, the user, rather than withdrawing a clean length of toweling, may simply dry his hands on that portion of the depending front leg of the loop that has previously been soiled. Indeed, rather than withdrawn a fresh length of toweling, some users may handle and dry their hands on both the soiled portion of the front leg of the loop and the soiled rear leg portion of the loop.

Another disadvantage of the prior continuous towel dispensers of the kind referred to above, is that the trailing end of the toweling drops downwardly and hangs well beneath the dispenser when the supply of clean toweling becomes exhausted.

Because there is no further clean toweling available to be dispensed, and because the prior dispensers, for for most part, have been constructed in such a manner that the withdrawal of clean toweling simultaneously winds up an equivalent amount of soiled toweling from the rear leg of the depending loop, the prior dispensers have had no means by which the trailing end of the exposed and soiled toweling may be withdrawn or retracted into the cabinet. Thus, when the supply of clean toweling becomes exhausted and a new supply of clean toweling is not promptly installed in the dispenser by the janitor or other person who maintains the cabinet, a series of subsequent users may dry their hands, one after another, on the soiled trailing end of the toweling which hangs beneath the towel-dispensing cabinet. This may constitute a health hazard in certain circumstances and, in any event, the appearance of a hanging, soiled, trailing end of toweling in a public washroom or elsewhere is unsightly and distasteful.

One of the principal objects of the present invention is to overcome and avoid the above-mentioned objectionable features of prior towel dispensers and to provide a highly-improved towel dispenser having new and novel means therein by which the soiled toweling is automatically withdrawn from its use position when a user has completed his drying operation, thereby avoiding the unpleasant appearance of exposed soiled toweling and avoiding the tendency for the next user to handle or use the previously-soiled toweling. Another object of the present invention is to provide, in an improved towel-dispensing device of the kind just referred to, novel means for retracting the soiled toweling from its use position, with a portion of the soiled toweling being retracted automatically into storage position within the dispenser cabinet and the remaining portion of the soiled toweling being retracted upwardly against the bottom of the cabinet in a position wherein that portion of the toweling cannot readily be grasped by the next user preparatory to withdrawal of another clean length of toweling.

A further object of the present invention is to provide highly-improved and novel soiled-towel retraction and storage means of the general kind just referred to, including time-delay means actuated in response to the dispensing of clean toweling to a use position for use by a first user, automatically actuated in response to the timing out of the time-delay means for withdrawing soiled toweling from the use position, thereby minimizing or avoiding the tendency of the next user to handle the toweling previously soiled.

Another object of the present invention is to provide, in a towel dispenser of the foregoing kind, highly-improved and novel means for permitting the user of the dispenser to grip only clean toweling preparatory to his withdrawal of additional clean toweling from the dispenser and to permit the user, simultaneously with his withdrawal of clean toweling, also to withdraw, from a retracted and storage position within the dispenser, a length of previously-soiled toweling, so that the loop which will thereupon depend below the dispenser will be compromised in its front leg of clean and fresh toweling, with at least a portion of the back leg of the loop being comprised of soiled toweling, the soiled portion of the depending loop being in the upper portion of the rear leg of the loop where it is not likely to be handled by the user.

Still another object of the present invention is to provide, in a towel-dispensing device of the aforesaid kind, highly-improved and novel mechanism for accomplishing the foregoing objects, which mechanism occupies a minimum of space, is simple of construction and inexpensive to manufacture, is entirely reliable and requires little or no maintenance, and is of a nature such that the clean toweling may be easily and quickly loaded within the cabinet and threaded through the mechanism preparatory for use.

In addition to the previously-described disadvantages of prior continuous towel-dispensing devices, most of the prior dispensers have employed a measuring roll over which the clean toweling is withdrawn as it is dispensed, so as to measure the length of toweling dispensed and tend to insure that the depending loop of toweling beneath the cabinet is not progressively lengthened or shortened during successive dispensing operations. In the prior dispensers, however, there has been, in many cases, a tendency for the toweling to slip with respect to the measuring roll, so that the length of the depending loop of toweling below the dispenser does not remain constant. Various means have been heretofore suggested for curing this difficulty, but, for the most part, such prior means have either failed satisfactorily to solve the difficulty or have made it inconvenient to load and thread clean toweling through the dispenser. Another important object of the present invention, therefore, is to overcome these disadvantages and objections to the prior continuous cloth towel dispensers, and to provide highly-improved and novel means for insuring against slippage of the clean toweling with respect to a measuring roll during successive dispensing operations. To this end it is a further object of the present invention to provide novel means in conjunction with a measuring roll in a continuous towel-dispensing cabinet for insuring that the clean toweling is constantly held in firm contact with a measuring roll to avoid slippage. Yet another object of the present invention is to provide means of the kind just mentioned which occupies a minimum of space, is simple and inexpensive to manufacture, and provides absolutely no interference while the dispenser is being loaded with clean toweling.

Yet another object of the present invention is to provide a new and novel time-stop mechanism particularly well-adapted for use in towel dispensers having the foregoing characteristics, wherein the time-stop mechanism is extremely simple, fool-proof, occupies a minimum of space, is entirely reliable, and requires little or no maintenance. Still another object of the present invention is to provide a novel time-stop mechanism of the character just stated which serves to stop the withdrawal of clean toweling from the dispenser when a predetermined length of toweling has been withdrawn and, after timing out, permits the novel towel retraction and storage mechanism referred to above to retract a portion of the depending towel loop upwardly against the bottom of the cabinet and withdraw the remainder of the towel loop into the dispenser cabinet itself. Yet another object of the present invention is to provide a time-stop mechanism of the kind just stated which, unlike all prior time-stop devices known to applicant suitable for use in conjunction with towel dispensers, permits a second user to withdraw a full predetermined length of clean toweling from the dispenser, despite the fact that the next prior user may have withdrawn less than the permitted maximum amount. Thus, one of the features of the novel time-stop mechanism hereinafter described and claimed is that a user is under all conditions permitted to withdraw the maximum predetermined amount of clean toweling from the dispenser.

Still another object of the present invention is to provide a novel time-stop mechanism of the kind just stated, wherein the timing operation begins during the initial withdrawal of toweling rather than at the end of the withdrawal, and wherein the timing operation is entirely independent of the amount of clean toweling withdrawn.

Still another object of the present invention is to provide a time-stop mechanism having all of the aforesaid characteristics, but which may be easily and conveniently varied to change the predetermined amount of clean toweling that may be withdrawn from the dispenser in a single operation.

Yet another important object of the present invention is to provide, in conjunction with the above-described time-stop mechanism and the towel retraction and storage apparatus above referred to, means for avoiding all tendency of the towel retraction and storage apparatus to retract into the dispensing cabinet any portion of the depending towel loop during the timed period determined by the time-stop, whereby a user has available a free-hanging loop of toweling upon which he may easily and conveniently dry himself without firmly holding and gripping the toweling during the drying procedure.

These and other important objects and advantages of the present invention will be apparent from the following description of a preferred embodiment therefor, taken with the accompanying drawings wherein:

FIGURE 1 is a perspective view of a towel dispenser of the continuous-towel type embodying and constructed in accordance with the present invention, the dispenser being shown with its top and front cover in the raised or open position so as to show a portion of its interior and to illustrate the clean towel roll and the soiled towel roll within the cabinet;

FIG. 2 is a perspective view of the towel dispensing cabinet in its normal use condition, with a loop of toweling being represented in its use position by broken lines beneath the dispenser;

FIG. 6 is a vertical cross section taken substantially along the line 6—6 of FIG. 4, but with certain of the parts omitted for clearness of illustration and with certain portions of the structure being illustrated schematically;

FIG. 6A is a greatly enlarged fragmentary view of a portion of the brake mechanism illustrated in the upper left-hand portion of FIG. 6;

FIG. 7 is a fragmentary cross-sectional view taken substantially along the line 7—7 in FIG. 4 primarily to show the time-stop mechanism in its side elevation;

FIG. 8 is an enlarged fragmentary cross sectional view taken substantially along the line 8—8 in FIG. 7, showing a front view of a portion of the time-stop apparatus employed in the dispenser;

FIG. 9 is an enlarged fragmentary cross-sectional view taken substantially along the line 9—9 in FIG. 7 to illustrate a rear view of the time-stop mechanism, but with the suction cups omitted, the view showing in its normal position a pivoted plate employed in the time-stop mechanism and showing an alternate form of a stop dog which may be employed therein;

FIG. 10 is an elevational schematic side view of the time-stop mechanism in its normal condition, this being the condition which exists after a towel-dispensing operation has been completed, with the dispenser being in condition ready for the next dispensing operation;

FIG. 11 is a similar view showing the condition of the time-stop mechanism after withdrawal of clean toweling from the dispenser has been started, but before withdrawal of the predetermined maximum amount of clean toweling has been accomplished;

FIG. 12 is a similar schematic elevational view showing the time-stop mechanism in condition when withdrawal of the maximum predetermined amount of clean toweling has been accomplished and further withdrawal has been stopped by the time-stop mechanism, but with the time-stop mechanism not yet timed out to permit retraction of the towel loop or to permit a subsequent withdrawal of clean toweling;

Figure 4:
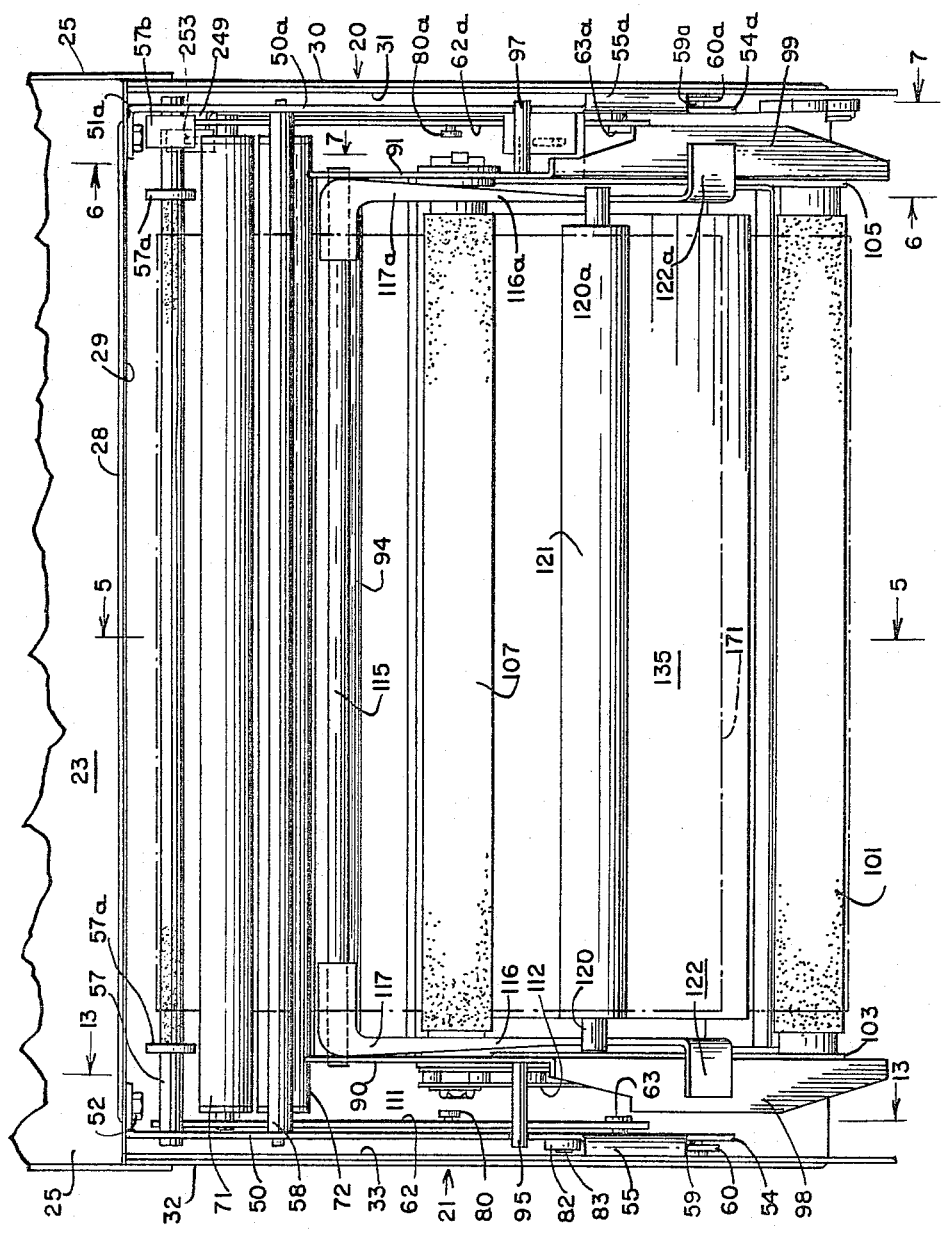
FIG. 4 is a top plan view of the dispenser mechanism, with the cover thereof being broken away and being shown as pivoted to an exaggerated open position.
Figure 13:
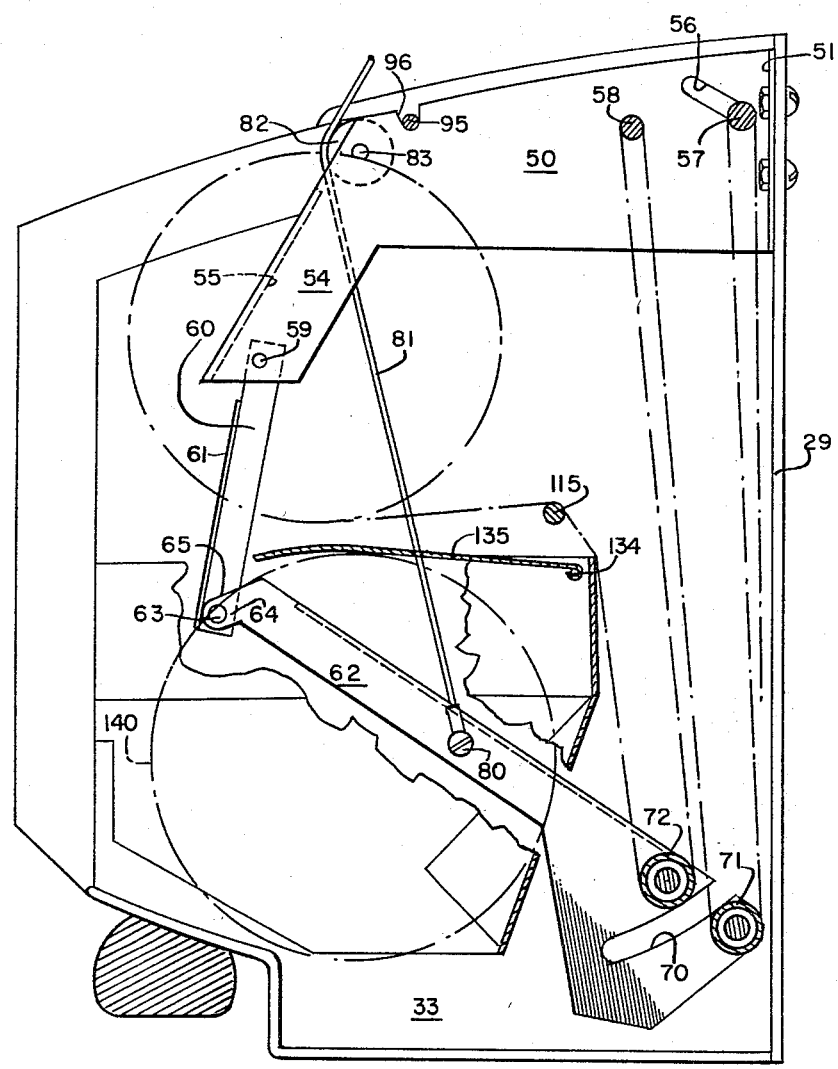

FIG. 13 is a schematic vertical cross section through the dispenser substantially along the line 13—13 of FIG. 4, with many parts omitted for clearness of illustration, to show the parts of the soiled towel retraction and storage mechanism in the position they occupy after the supply of clean toweling has been exhausted and the trailing end of the toweling has been withdrawn by the mechanism entirely into the dispensing cabinet;

FIG. 14 is a schematic, vertical cross section, with the right-hand side of the cabinet removed, to show the position of the principal parts of the dispensing mechanism in their normal condition before a dispensing operation has been initiated;

FIG. 15 is a view similar to FIG. 14, but schematically showing the internal parts of the dispensing mechanism in the position occupied thereby when the user of the cabinet has withdrawn therefrom the full toweling loop for use purposes, and before the time-stop mechanism has timed out to permit the internal parts of the structure to return to the loop-retracting normal position thereof shown in FIG. 14;

FIG. 16 is a similar view showing the parts of the dispenser in the position occupied thereby after the supply of clean toweling has become exhausted, the time-stop mechanism having timed out, and the entirety of the toweling exteriorly of the dispenser having been withdrawn into the dispenser; and FIG. 17, which appears on the first sheet of drawings, is an enlarged, fragmentary, vertical sectional view taken through the lower portion of the front cover or wall of the cabinet to show the novel means for preventing slippage of the clean towel with respect to the measuring roll.

As illustrated in the drawings, the towel-dispensing mechanism of the present invention is shown in a dispensing cabinet having side walls 20 and 21 and a cover 22. The cover 22 is comprised of a top portion 23 and a front wall 24, both of which may be integrally formed from a single sheet of stainless steel or the like. The front wall 24 and the top portion 23 may have side flanges 25 formed thereon, and the lower edge of the front wall 24 has a rearwardly-directed flange 26 formed along its lower edge. The rear edge of the top portion of the cover 23 is pivotally mounted at 27, by means of a piano hinge 28 (FIG. 5) or the like, upon the upper edge of a rear wall 29 (FIG. 5) which constitutes the back of the cabinet. This rear wall 29 may be provided with a plurality of stud openings or other means (not shown) by which the cabinet may be removably mounted upon a wall or other supporting structure.

Figure 3:
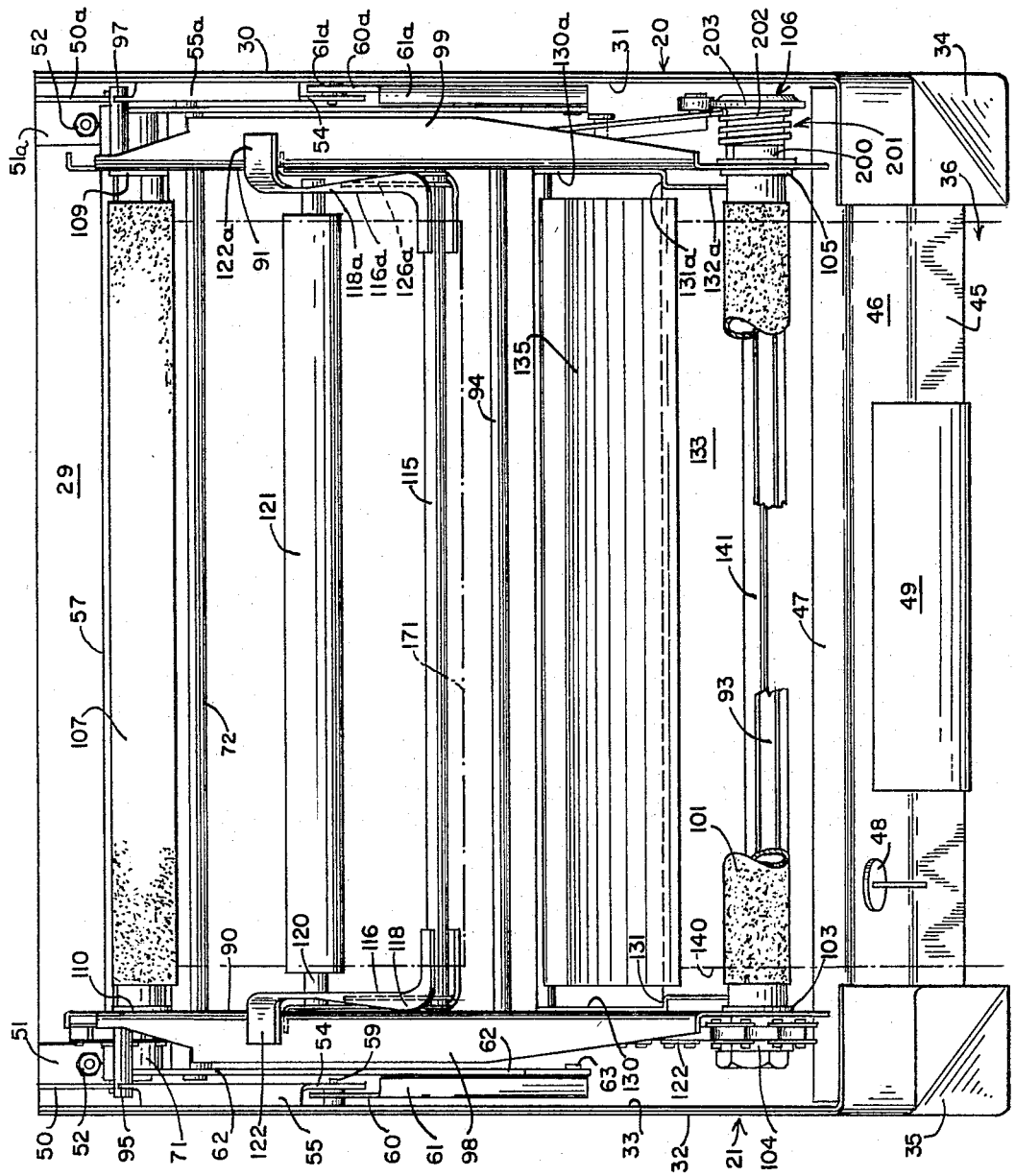
FIG. 3 is an enlarged front elevational view of the dispenser of FIGS. 1 and 2, but with the cover and front of the cabinet removed and with the clean towel supply roll and the soiled towel roll being omitted and, in part, being represented by broken lines.

The right-hand side 20 of the cabinet, in the form illustrated, is comprised of an outer plastic sheet 30, of any suitable plastic material, secured by any desirable means upon an inner metal sheet 31 (FIG. 3). The left-hand side wall 21 similarly is comprised of an outer sheet 32 secured to an inner metal sheet 33. In conjunction with each of the side walls 20 and 21, the inner metal sheets 31 and 33 are secured at their rear edges, as by welding or the like, to the side edges of the back wall 29. The cabinet thus provides an attractive, durable, and relatively-inexpensive enclosure for the dispensing mechanism hereinafter described.

In the form shown, the lower portion of the plastic sheet 30 on the right wall 20 of the cabinet is curved downwardly and inwardly to provide a downwardly-extending curved member 34 which, in conjunction with a similarly downwardly extending member 35 on the opposite end wall 21 provides a channel 36 within which a portion of the retracted toweling loop will lie, as subsequently explained, when the cabinet is in its normal condition preparatory to the withdrawal of toweling.

Figure 5:
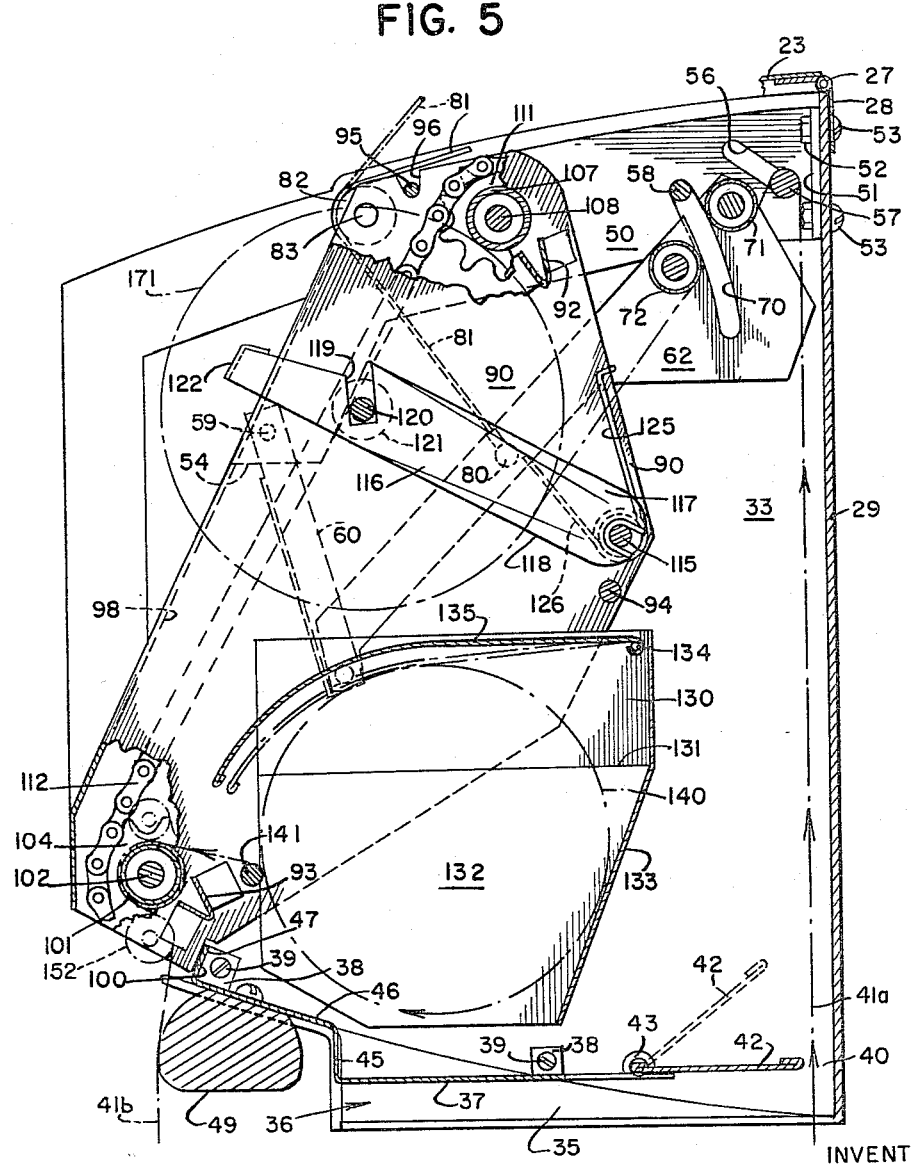
FIG. 5 is a vertical cross-sectional view taken substantially along the line 5—5 in FIG. 4, with certain of the parts being omitted and/or cut away for clearness of illustration, the parts being shown in the position occupied thereby when the user has withdrawn a loop of toweling and before the loop has subsequently been retracted.

The bottom of the cabinet (FIG. 5) is comprised of a horizontal plate 37 which extends laterally across the cabinet from the side wall plate 31 to the other side wall plate 33, and the bottom or floor plate 37 may be secured to the plates 31 and 33 in any desired manner. In the present instance, the floor plate 37 is shown to have upwardly extending lugs 38 formed thereon which are secured by screws 39 to the side plates 31 and 33. The rear edge of the floor plate terminates short of the back wall 29, to provide a large opening 40 through which the rear leg 41a of a towel loop 41b may extend upwardly into the cabinet. This opening 40 is partially closed by the door 42 pivotally mounted upon the floor plate 37, adjacent its rear edge, by means of a piano hinge 43. As seen in FIG. 5, the door 42 may be pivoted upwardly from its horizontal position to a raised position, this feature being utilized, as will subsequently be described, during the loading of the cabinet with clean toweling and during the threading of the toweling length 41a upwardly into the interior of the cabinet.

As perhaps best seen in FIG. 5, the lower surface of the floor plate 37 provides the upper surface of the channel 36, previously mentioned, within which a portion of the retracted towel loop will lie when the cabinet is in its normal condition prior to the withdrawal of toweling therefrom by a user. The front portion of the floor plate 37 has an upwardly extending lip 45 formed thereon (FIG. 5) and a forwardly directed ledge 46 formed on the upper portion of the lip 45. This ledge 46 has an upwardly turned and slightly rearwardly directed forward lip 47 formed thereon upon which, as will be subsequently explained, rests the internal mechanisms of the dispenser structure.

As seen in FIG. 3, the ledge 46 may have a key operated lock 48 provided therein. If desired, this lock 48 may be connected to linkages and latches, of common and well-known construction not illustrated, which may cooperate with the front wall 24 of the door of the cabinet in order to secure the front wall 24 and the cover 23 in the closed condition. In this closed condition, in the form of the cabinet illustrated, the flanges 25 of the top 23 and the front wall 24 of the pivoted cover overlap the upward and forward edges of the walls 20 and 21.

The ledge 46 has mounted on its underside a rounded spacing member 49 which may be secured to the ledge 46 by screws or the like. This spacing member 49, as will be subsequently explained, holds the front portion of the retracted towel loop 41c, ahead of the channel 36, in position wherein the edge portion of the toweling may be readily grasped by a user preparatory to withdrawal of a length of clean toweling from the interior of the cabinet. In FIG. 1, the edge portions of the toweling just referred to as being readily available for gripping, are designated by the numerals 41e and 41d. When the loop 41c of the toweling is in its fully retracted position, such as shown, for example, in FIG. 14, the toweling, for reasons later to be described, will extend downwardly and then rearwardly around the spacing member 49 and rearwardly through the channel 36 to the opening 40 and thence upwardly into the interior of the cabinet. The edges of that portion of the toweling residing within the channel 36 are hidden and are made inaccessible by the depending members 34 and 35 on the lower ends of the cabinet walls 20 and 21, so that a user, as he approaches the cabinet, will not grasp the lateral edges of that portion of the toweling within the channel 36. Indeed, that portion of the toweling within the channel 36 is likely to be soiled. Instead, the spacing member 49 holds the front portion of the toweling, at the forward lower front of the cabinet, in position so that the edges 41e and 41d of the toweling (see FIG. 1) will be readily accessible and available to the user to be grasped between his fingers preparatory to the withdrawal of fresh toweling.

Referring now to FIGS. 3, 4, 5, and 13, a mechanism support bracket 50 is mounted within the cabinet adjacent the inner metal wall 33 of the left-hand wall 21 of the cabinet. This mechanism support bracket 50 has an inturned flange 51, formed at its rear end, the flange being secured to the rear wall 29 of the cabinet as by nuts 52 and bolts 53, or by any other suitable means, such as by welding. The mechanism support bracket 50 extends forwardly from the flange 51 and has a downwardly and forwardly extending leg 54 formed thereon. This leg 54, along its upper or forward edge has an outturned flange 55 formed thereon to rigidify the same, and the leg, if desired, may be suitably fastened to the inner plate 33 of the wall 21.

Near the flange 51 adjacent the rear of the mechanism support bracket 50 there is provided in the bracket 50 a diagonally rearwardly and downwardly extending slot 56 which rotatably and slidably receives one end of a brake roller 57. Ahead of the slot 56 and the brake roller 57, the mechanism support bracket 50 has an opening provided therethrough which rotatably contains one end of an intermediate roller 58. This roller 58 has a fixed axis but is free to rotate in the mechanism support bracket 50.

Inside the right-hand wall 20 of the cabinet there is provided a mechanism support bracket 50a which is identical to the bracket 50, except that it is a mirror image thereof. Thus, the mechanism support bracket 50a has at its rear a mounting flange 51a that is secured by nuts and bolts 52 and 53 to the rear wall 29 of the cabinet. The right-hand mechanism support bracket 50a also is provided at its forward end with a downwardly and forwardly directed leg 54a which has an outwardly-directed flange 55a formed thereon. Like the mechanism suppport bracket 50, the bracket 50a has a rearwardly and downwardly extending slot 56a which corresponds to the slot 56 and rotatably and slidably receives the other end of the brake roller 57 (see FIG. 6). Similarly, the mechanism support bracket 50a also has an opening therein for rotatably receiving the right-hand end of the intermediate roller 58.

At the lower end of the leg 54 on the mechanism support bracket 50 a link 60 is pivotally mounted as by a pivot pin 59. The link 60 has an inwardly-directed flange 61 formed thereon, and the free end of the link 60 has pivotally mounted thereon a second link 62, the pivotal joint being provided by a pin 63. The pin 63 extends through an elbow or laterally-extending arm 64 on the link 62, this elbow or arm providing an edge 65 which will engage the flange 61 of the first link 60 when the link 62 is pivoted upwardly, as will subsequently be explained.

The downwardly-extending leg 54a of the mechanism support bracket 50a, at the right-hand side of the cabinet, has a link 60a pivoted thereto by a pivot pin 59a, the link 60a having a flange 61a formed thereon similar to that of the previously-mentioned flange 61 on the link 60. The lower end of the link 60a carries a pivot pin 63a which pivotally receives a link 62a corresponding in every respect to the previously mentioned link 62, except that it is a mirror image of the latter.

The link 62 has a deep, curved slot 70 formed therein which will receive or pass around the roll 58 when the link is pivoted upwardly beyond the position thereof seen in FIG. 5, this exaggerated elevated position of the link 62 occurring when threading fresh toweling through the cabinet, as will hereinafter be described. The link 62a has a corresponding slot 70a therein for the same purpose (see FIG. 6).

The link 62 is provided with openings on opposite sides of the slot 70 for rotatably receiving and retaining the adjacent ends of a rear takeup roller 71 and a forward takeup roller 72. These rollers are parallel and may be of any suitable construction. In the present case they are shown to be hollow with axles or shafts extending therethrough. The opposite ends of the rollers 71 and 72 are similarly rotatably received in openings provided therefor in the link 62a at the right side of the cabinet (see FIG. 6). The links 60 and 60a and the links 62 and 62a, together with the rollers 71 and 72, along with the brake roller 57 and the intermediate roller 58, constitute a soiled towel retracting and storage mechanism, as will be more fully explained later herein.

The link 62 (see FIG. 5) is provided with a screw or pin 80 to which there is attached one end of a cord 81, this cord extending upwardly around a rotatable wheel 82, the latter of which is rotatably mounted on the outside of the mechanism support bracket 50 by means of a pin 83. The upper end of the cord 81 is suitably attached to the inside of the upper portion 23 of the cover 22. The length of the cord 81 is such that when the cover 22 is pivoted to its open position, the link 62 will be raised upwardly beyond the position thereof seen in FIG. 5, thereby lifting the rollers 71 and 72 above the elevation of the brake roller 57 and the intermediate roller 58 to permit easy feeding of an end of the toweling between the rollers as will hereinafter be explained.

The link 62a at the right-hand side of the cabinet has another cord 81a secured thereto by means of a pin 80a. The cord 81a extending upwardly about a wheel 82a mounted on the outside of the mechanism support bracket 50a and thence upwardly to the top portion of the cover 22. The cord 81a is seen in FIG. 1. Thus it will be appreciated that as the cover 22 is manually raised, the cords 81 and 81a will automatically elevate the links 62 and 62a to their exaggerated raised position preparatory to loading of the cabinet with fresh toweling.

The weight of the links 60, 60a, 62 and 62a, together with the weight of the rollers 71 and 72 causes the links 62 and 62a with the rollers 71 and 72 to want to fall to their lowermost position illustrated in FIGS. 13 and 16. Furthermore, because of the articulated or pivoted relationship between the links 62 and 60, and between the link 60 and the lower leg 54 of the mechanism support bracket 50, and because of the like relation of the links 60a, 62a and the leg 54a, it will be understood that the vertical motion of the takeup rollers 71 and 72 traces a substantially vertical path inwardly of, but adjacent to, the rear wall 29 of the cabinet.

The present towel-dispensing mechanism includes a removable unit which has as its frame a left-hand mechanism side plate 90 and a right-hand mechanism side plate 91, each being disposed in vertical position. The two mechanism side plates 90 and 91 are rigidly secured together by an upper cross member 92 of V-shaped cross section, and a lower cross member 93 of the same V-shape (see FIG. 5). The opposite ends of these cross members 92 and 93 have flanges formed thereon which are welded or otherwise permanently secured to the respective inside surfaces of the plates 90 and 91. If desired, the mechanism side plates 90 and 91 may be further secured together by a cross rod 94 (FIG. 5), the opposite ends of which may be welded to the side plates. Adjacent the upper end of the side plate 90, there is welded or otherwise secured thereto a stub shaft or boss 95 which extends outwardly from the side of the plate 90 and removably rests in a slot 96 formed in the upper edge of the mechanism support bracket 50 (see FIGS. 3, 5 and 13). The other mechanism side plate 91 has a similar stub shaft or boss 97 fixedly secured thereto which is removably received and rests in a corresponding slot formed in the upper edge of the right-hand mechanism support bracket 50a. Thus, the two mechanism side plates 90 and 91 and their rigid cross members 92, 93, and 94 provide a frame which, in effect, hangs from the mechanism support brackets 50 and 50a. The forward edges of the mechanism support plates 90 and 91 extend forwardly and downwardly and have respectively formed thereon outwardly-directed flanges 98 and 99. Adjacent the lower ends of the flanges 98 and 99, the respective side plates curve downwardly and then rearwardly to a position adjacent the cross member 93. Below the cross member 93, each of the side plates 90 and 91 is provided with an upwardly-extending edge 100 which rests or bears upon the forward lip 47 of the cabinet floor 37, as perhaps best seen in FIG. 5. It will thus be understood that the framework provided by the side plates 90 and 91 and by the cross members 92, 93, and 94 may easily be lifted out of the cabinet simply by pivoting the lower portion of the frame forwardly away from the lip 47, and then lifting the support bosses 95 and 97 upwardly out of the slots or grooves in which they normally reside in the mechanism support brackets 50 and 50a.

The mechanism side plates 90 and 91 have rotatably mounted therebetween, adjacent their lower ends, a measuring roll 101, the surface of which may be covered with sandpaper or other granular material which will tend to prevent a towel from slipping thereacross. The measuring roll 101 may be of hollow construction with a central shaft 102 extending therethrough. The left-hand end of the measuring roll 101, as viewed in FIG. 3, is rotatably mounted in a suitable bearing 103 provided in the mechanism side plate 90, and the left-hand terminal end of the roll extends through the side plate and has fixed thereon, outside the plate 90 a toothed sprocket 104. The right-hand end portion of the measuring roll 101, as seen in FIG. 3, is rotatably journaled in a suitable bearing 105 in the mechanism side plate 91, and the right-hand terminal end of the roller, outside the mechanism side plate 91, has fixed thereon a threaded stop member assembly, designated generally by the numeral 106, which will be described in greater detail hereinafter.

At the uppermost ends of the mechanism side plates 90 and 91, there is journaled therebetween a soiled-towel takeup drive roll 107. This roll, like the measuring roll 101, has a sandpaper or other granular surface thereon. The drive roll 107 may be hollow and may have a central shaft 108 extending therethrough. The right-hand end of the shaft 107, as viewed in FIG. 3 is rotatably mounted in a suitable bearing 109 secured in the mechanism side plate 91 and the opposite end of the shaft is rotatably mounted in a bearing 110 provided in the mechanism side plate 90. The left-hand end of the roller 107 extends entirely through the side plate 90 and has fixed upon its outer end a tooth sprocket 111 which may be identical to the previously described sprocket 104 on the measuring roll 101. In any event, the sprockets 104 and 111 should be of equal size and should have the same number of teeth thereon. The two sprockets 104 and 111 are rotatably joined by a chain 112 which causes the two sprockets, and thus the measuring roll 101 and the takeup drive roll 107, to rotate simultaneously and at the same speed. The diameters of the measuring roll 101 and the takeup drive roll 107 are the same, so that their surface speeds, when rotated, will be identical.

Below the takeup drive roll 107 and adjacent the rear of the mechanism side plates 90 and 91 there is provided a transversely extending rotatable shaft 115 that is suitably journaled, at its respective opposite ends, in the two mechanism side plates 90 and 91. Fixedly secured to the shaft 115 adjacent the left end, as viewed in FIG. 3, there is a yoke arm 116 which has upper and lower outwardly directed flanges 117 and 118 formed thereon. The yoke arm 116 normally extends upwardly and forwardly with respect to the shaft 115 upon which it is mounted, and it is provided with a slot 119 or an open top half-bearing which is adapted rotatably to receive a bearing or trunnion 120 which is provided on the left-hand end of a towel takeup roll 121. The forwardmost end of the yoke arm 116 extends forwardly beyond the plane of the flange 98 on the mechanism side plate 90, and has formed thereon a laterally directed flange 122 which is disposed ahead of and overlies the flange 98.

The right-hand end of the rotatable yoke arm shaft 115, as viewed in FIG. 3, is provided with a similar yoke arm 116a which is fixedly secured to the shaft 115 and which is identical to the yoke arm 116 except that it is a mirror image thereof. Thus the yoke arm 116a has a slot or open top bearing therein, like the slot or bearing 119, for rotatably and removably receiving a bearing 120a which is provided on the right-hand end of the soiled towel roll 121, and the yoke arm 116a has flanges 117a and 118a formed thereon that are like the flanges 117 and 118 formed on the yoke arm 116. Similarly, the forwardmost end of the yoke arm 116a has an outwardly directed flange 122a formed thereon which overlies the flange 99 of the mechanism side plate 91. The soiled towel takeup roll 121 is arranged to rotate freely in the bearings or slots 119 and 119a on the respective yoke arms 116 and 116a and, as will be seen in FIG. 5, the takeup toweling roll 121 may be removed from the yoke arms 116 and 116a simply by lifting upwardly on the roll.

The yoke arms 116 and 116a and the rotatable yoke shaft 115 are welded or otherwise secured together in rigid and fixed relationship so that the yoke arms 116 and 116a are adapted to pivot in unison as the shaft 115 is turned.

The takeup yoke provided by the two yoke arms 116 and 116a and the shaft 115 are firmly urged toward clockwise movement, as viewed in FIG. 5, by a pair of strong springs. One of these springs is seen in FIG. 5 and comprises an arm 125 having its outer end looped or clipped across the rear edge of the mechanism side plate 90. The spring is coiled around the shaft 115, and its other end provides an arm 126 which bears upwardly and resiliently against the under side of the upper flange 117 of the yoke arm 116. The opposite end of the yoke shaft 115 is provided with a like spring having an arm 126a which bears upwardly against the upper flange 117a of the yoke arm 116a. The latter spring is also coiled about the shaft 115, as seen in FIG. 3, and it has another arm (not shown) which is hooked across the back edge of the mechanism side plate 91. It will thus be appreciated that the yoke arms 116 and 116a are firmly, forcefully, and resiliently urged upwardly, in rotation about the axis of the yoke shaft 115, so as to tend constantly to carry or urge the towel takeup roll 121 toward the granularly-surfaced towel takeup drive roll 107.

Below the yoke construction just described, there is provided, between the mechanism side plates 90 and 91, a clean towel roll bed. This bed is comprised, adjacent the mechanism side plate 90, of a side plate 130 which is welded or otherwise secured to the inside surface of the mechanism side plate 90. The plate 130 has an inwardly-directed flange or shelf 131 formed thereon. From the shelf 131 the plate extends downwardly to provide towel bed end wall 132 which is inwardly offset with respect to the upper portion of the plate 130. The opposite end of the towel bed may be identical to that just described, except that it is the mirror image thereof. Thus, the left-hand end of the towel bed, as seen in FIG. 3, is comprised of a plate 130a which is welded or otherwise secured to the inside of the mechanism side plate 91. The plate 130a has an inwardly-directed flange or shelf 131a formed thereon, and the lower portion of the plate extends downwardly from the shelf or flange 131a to provide the right end 132a of the towel bed. The ends 132 and 132a may terminate above the floor 37 of the towel cabinet, and the rear wall 133 of the towel bed may comprise a formed plate of a shape conforming to the rear edges of the plates 130, 132, and the plates 130a, 132a and welded or otherwise secured thereto.

Between the end plates 130 and 130a of the towel bed there extends a shaft or rod 134 upon which there is pivotally and rotatably mounted a towel-divider cover 135 which extends forwardly from the rod or shaft 134 and then downwardly in a curve to a position above and slightly behind the lower transverse frame member 93 which extends between the mechanism side plates 90 and 91. This towel-divider plate or cover rests upon the roll 140 of clean toweling which is normally contained within the cabinet.

A roll 140 of clean toweling, when installed in the present dispenser, rests substantially in the position thereof shown in FIG. 5, the rear portion of the roll lying loosely against the downwardly and forwardly directed rear wall 133 of the towel bed, with the opposite ends of the roll being disposed between the end plates 132 and 132a of the towel bed. The forward side of the clean towel roll 140, on the other hand, may rest upon a guide roller 141 which is rotatably mounted between the mechanism side plates 90 and 91 immediately ahead of the towel bed. As seen in FIG. 5 the clean toweling is fed from the bottom of the roll 140, upwardly and forwardly over the roller 141, then across and around the front side of the measuring roll 101.

In FIG. 17 there is illustrated a novel mechanism by which a towel, as it moves about the measuring roll 101, is caused, under all circumstances, to be maintained in constant contact with the measuring roll throughout approximately 180° of the measuring roll surface. As illustrated in FIG. 17, there is a bracket 150 having a flange 151 formed thereon, the latter of which is welded to the inner surface of front wall 24 of the door of the cabinet at a position somewhat inwardly of the mechanism side plate 90. Adjacent the opposite side of the door 24, at a position somewhat inwardly of the side plate 91, a similar bracket (not shown) is welded. Each of the brackets 150 has a rearwardly directed finger 152 formed thereon and the two fingers 152a have rotatably journaled therein a lower roll 152. As illustrated in FIG. 17, the lower roll 152 may be of hollow construction and may have a shaft 153 extending therethrough, the axis of the shaft 153, which constitutes the axis of the roll 152 being preferably disposed vertically below the axis of the measuring roll 101 when the cabinet door 22 is in its closed position. The roll 152 need not and should not contact the measuring roll. Adjacent the upper end of each of the brackets 150 a second bracket 154 is rotatably mounted upon a pin or screw 155 that is fixed in the bracket 150. Each bracket 154 extends inwardly toward the interior of the cabinet when the door thereof is closed, and each bracket 154 is provided with a downwardly and inwardly directed longitudinally extending slot 155.

The elongated downwardly inclined slots 155 of the two door brackets 154 rotatably receive the trunnions 156 provided at the opposite ends of a pressure roller 157. Each bracket 154 is spring-urged to pivot in the clockwise direction, as viewed in FIG. 17, about the pivot 155. Similarly, the pressure roller 157 is spring-pressed downwardly and rearwardly against the measuring roll 101. For this purpose, each bracket 154 is provided with a spring having one end or leg 160 thereof which presses against the inside surface of the front wall 24 of the cabinet door. The spring is wrapped loosely about the pivot pin 155 and has another arm or leg 160a which extends from the wrapping about the pin 155 to a screw 161, which is threaded into the bracket 154 and securely binds and holds the leg 160a. The springs at the screws 161 on each bracket 154 then extend downwardly to a position in resilient contact with the forward or front surface of each trunnion 156. The result is that the brackets 154 are constantly urged downwardly in a pivotal manner toward the measuring roll 101, and the terminal end 162 of each spring constantly urges the pressure roller 157 forwardly and downwardly in the slots 155 against the upper portion of the measuring roll 101, simultaneously to cause the rear sides of the trunnions 156 to bear against flanges 158 which are struck inwardly from the mechanism side plates 90 and 91 so as to orient the pressure roll 157 in a position in which its axis, despite inaccuracies that may exist in the door structure, always resides in a position parallel to the axis of the measuring roll 101.

It will later become apparent from the description that follows that one need load a clean roll of toweling 140 in the cabinet only when an earlier supply roll 140 of clean toweling has become exhausted. In order to load the present dispensing mechanism with a clean roll, the operator unlocks the door 22, if a lock is used, and the door is lifted upwardly approximately to the position shown in FIG. 1. By virtue of the cords 81 and 81a, the elevation of the door to its fully-opened position automatically raises the links 62 and 62a to a fully-elevated position, above that illustrated in FIG. 5, as shown in FIG. 1, in which position the towel retraction and storage rolls 71 and 72 are disposed above the level of the brake roll 57 and the intermediate roller 58. In this highly-elevated position of the links 62 and 62a, the slots 70 and 70a in the respective links pass upwardly and receive the intermediate roll 58. Door stays may be provided for holding the door in its elevated position and thus for holding, at the same time, the links 62 and 62a in their elevated positions. The door stays may be of any suitable construction. For example, as suggested in FIG. 1, a door stay assembly 170 may be pivotally mounted within the door 22. If desired, the stay assembly may be of a U-shaped construction, with the base of the U pivotally secured on the inside of the door, and having two side legs which, when the door 22 is open, may rest in any suitable fashion along the upper edges of the respective mechanism support brackets 50 and 50a.

With the door in its elevated position, a fresh clean towel supply roll 140 may be placed in the towel bed previously described and beneath the pivoted towel divider plate 135, with the towel divider plate resting upon the top of the roll. A length of fresh toweling is pulled from the under side of the clean towel supply roll 140 and is led across the rotatable guide roller 141 and around the measuring roll 101. With the toweling in this position and with a dispenser having preferred dimensions, about three feet of fresh toweling is pulled from the roll 140. The free end of this toweling is then fed by hand beneath the cabinet and upwardly through the rear opening 40, the door 42 being raised so as to provide ample hand room for this operation. The free end of the toweling is then raised upwardly along the inner surface of the back wall 29 of the cabinet, then over the brake roll 57, under the towel retraction and storage roll 71, over the intermediate roller 58, then under the towel retraction and storage roll 72. The prior roll of soiled toweling, represented in the present drawings by the numeral 171, is removed from the soiled towel roll 121, and the roller 121 is replaced in its position on the yoke arms 116 and 116a. The free end of fresh toweling leading from the towel retraction and storage roll 72 is wrapped around the roller 121 in a clockwise direction, as viewed in FIG. 5, and the yoke arms 116 are released, thus permitting the spring-pressed yoke arms 116 and 116a to carry the roller 121 (with the toweling wrapped thereabout) upwardly into resilient and forceful contact with the granular surface of the soiled towel takeup drive roll 107. The cover 22 of the cabinet is then closed, thereby permitting the links 62 and 62a to be lowered to the extent permitted by the toweling which is threaded about the brake roll 57, the towel takeup retraction roller 71, the intermediate roller 58, and the towel take-up and retraction roller 72. The length of fresh toweling that is initially withdrawn from the fresh towel roll 140, as previously described, should be such that the links 62 and 62a will be permitted by the toweling to drop approximately half way between the position of the links illustrated in FIG. 5 and the position thereof illustrated in FIG. 13. This position of the links 62 and 62a, as illustrated in FIG. 14, will cause the loose portion of the toweling towel loop 41c beneath the cabinet to be drawn snugly around the spacing member 49 and upwardly into the passage or channel 36 beneath the cabinet. The toweling within the cabinet will extend upwardly from the opening 40 and the door 42 and around the brake roll 58 and the other rollers just referred to, in the fashion illustrated in FIG. 14. As the door 22 is closed, the rollers 152 and 157, on the inside of the door, will come to the position with respect to the measuring roll 101 that is illustrated in FIG. 17. In this position, the pressure roll 157 will be bearing against the toweling on the upper side of the measuring roll. By virtue of the flanges or lugs 158, against which the trunnions 156 of the pressure roller 157 will then be bearing, the axis of the pressure roller 157 will be parallel to the axis of the measuring roll 101, so that there will be pressure contact by the roller 157 against the toweling entirely along the length of the measuring roll 101. At the same time, the disposition of the idler roller 152 directly beneath the measuring roller 101 will insure that the toweling, throughout its width along the measuring roller 101, will be in snug contact with approximately 180° of the surface of the measuring roller. This disposition and arrangement of the door rollers 157 and 152 insure that there will be no slippage between the toweling and the measuring roller when the toweling is subsequently grasped and pulled by a user. Furthermore, it will be appreciated that, because the pressure roller 157 is spring-pressed and is permitted to ride in the slots 155 of the bracket 154, the relationship previously described will not be disturbed, even though a seam in the toweling may pass between the pressure roller 157 and the measuring roller 101. The rollers 157 and 152 insure that the toweling will be in snug contact with the measuring roller at all times, including at the beginning of a towel withdrawal operation, and they will insure that no slack or slightly looped toweling reaches the measuring roller 101. Furthermore, from the description of the loading operation just given, it will be appreciated that the pressure roller 157 and the idler roller 152 offered no obstruction whatever to the feeding of the clean toweling during the loading operation.

It has previously been explained herein that, when a user prepares to employ the present dispenser in a drying operation, he grips the edge portions 41d and 41e of the toweling (FIG. 1) adjacent the lower edge of the front door 22 of the cabinet, and the user pulls downwardly on the toweling to dispense or withdraw from the clean toweling roll 140 a clean length of toweling. This clean length of toweling is, of course, added to or fed into the short loop 41c of toweling which has theretofore been drawn closely adjacent the bottom 37 of the cabinet in the channel 36. At the same time the user pulls on the edges 41d and 41e of the toweling, his downward pull withdraws from the cabinet, through the opening 40, a length of previously-soiled toweling, this latter length being added to the rear leg 41a of the toweling loop 41c. This withdrawal of previously-soiled toweling through the opening 40, in combination with the withdrawal of a clean length of toweling from the front of the cabinet provides a depending toweling loop 41c of normal length, as represented in FIGS. 2 and 15, upon which the user may easily and conveniently dry his hands with the use of the clean front leg 41b of the loop. The withdrawal of the length of previously-soiled toweling from the opening 40 is permitted by virtue of the fact that the towel retraction and storage rollers 71 and 72, together with their cooperating links 62 and 62a, are raised from their normal intermediate position to the elevated position shown in FIG. 5. More will be said later concerning this latter phase of the operation.

As the user withdraws the clean length of toweling from the lower front portion of the cabinet, his pull on the toweling rotates the measuring roll 101 in the direction of the arrow shown in FIG. 17. This rotation of the measuring roller 101, through the medium of the sprockets 104 and 111 and the chain 112, causes the soiled towel take-up drive roll 107 to rotate in the same direction. Because the upper surface of the soiled towel roll 171 is firmly pressed upwardly against the underside of the soiled towel takeup roll 107 by the spring-loading of the yoke arms 116 and 116a, the rotation of the soiled towel takeup drive roll 107 rotates the soiled towel roll 171 an amount sufficient to take up on the soiled towel roll 171 the same length of toweling that is withdrawn from the clean towel supply roll 140. The amount of toweling available for the loop 41c therefore remains constant. The rotation of the measuring roll 101, however, also actuates the novel time-delay mechanism 106, which will now be described in detail.

It has previously been explained that the measuring roll 101 is journaled adjacent the right-hand side of the dispenser in a bearing 105 carried by the mechanism side plate 91. The right-hand end extremity of the measuring roll extends through the bearing 105 and has fixedly secured thereon in any suitable manner, such as by keying, a laterally protruding stop dog 200 and a cylindrical time-stop lead member 201 having threads 202 formed thereon. Outwardly of the beginning ends of the threads 202, the stop-lead member 201 has formed thereon a cam 203 having a low cam surface 204 and a high cam surface 204a.

Well above the axis of the stop lead 201 and somewhat to the rear thereof, a time stop pivot pin 205 is fixedly mounted in the mechanism side plate 91, the pivot pin 205 protruding toward the right from the mechanism side plate 91, as shown in FIG. 8. The pin 205 is welded or otherwise secured in the mechanism side plate 91 and is further supported by a rounded bearing plate 206 having a rounded shoulder or nose 207 thereon at the position where the pin extends through the bearing plate. Pivotally and loosely mounted on the outer end of the pin 205, there is a stop plate 208 having riveted or otherwise fixedly secured on its underside, a stop latch 209. It is important that the plate 208 be able to rotate or pivot about the axis of the pin 205, and that it be permitted to tilt or "wobble" with respect to that axis. It is for this reason that the stop plate 208 is loosely mounted on the pin 205, as previously stated. To permit this "wobbling" motion of the stop plate 208 with respect to the pin 205, a soft and flexible rubber bearing may be used between the two, although, in the present illustration, a slightly different mounting arrangement is shown. As presently illustrated, the stop latch 209 (see FIG. 9) has a large opening 209a therein which is received on the pin 205. The outer end of the pin is provided with a head 205a which is disposed outside the latch 209 and in a loose opening 208a of the plate 208. Thus, the upper side of the opening 209a of the latch 209 rests on the upper surface of the pin 205, and the head 205a of the pin 205 prevents the plate 208 from inadvertently being dislodged from the pin. From FIGS. 8 and 9 it will be understood that the plate 208 may pivot around the axis of the pin 205, and that it may "wobble" or tilt with respect thereto, that is, the bottom of the plate, as seen in FIG. 9, may move in a direction toward the mechanism side plate 91 and may be permitted to return to its initial or normal position shown in the solid lines in FIG. 9. This permitted "wobbling" or tilting motion is also illustrated in FIG. 8 wherein the phantom lines represent the plate 208 in its normal position corresponding to that seen in FIG. 9, and wherein the solid lines represent the plate 208 when its lower portion has been moved toward the mechanism support plate 91.

As seen in FIGS. 7 and 9, the stop plate 208 has an inwardly-directed flange 210 formed thereon for rigidifying purposes, and on the rear edge of the flange there is an upstanding plate portion 211 which has a laterally-extending pad 212 formed thereon. The right-hand portion of the flange 210 (as viewed in FIG. 7) extends beyond the body per se of the plate 208 to provide a finger 213, on the underside of which there is mounted, by a suitable stud and nut, a soft rubber suction cup 214. Opposite the concave side of the suction cup 214, there is fixedly mounted a second suction cup 215 which has therein a small air opening at its center (not shown) which will permit suction annulling air to flow at a controlled rate into the concave area within the suction cup 215 after the two cups have been pressed together. The cup 215 may be mounted on a bracket 216 secured to the mechanism side plate 91 or to the end wall 132a of the clean towel bed. This bracket 216 has provided thereon a thumb screw 217 which may be adjustable to vary the position of a needle valve 218 which controls the effective size of the air opening in the suction cup 215 and thus controls the time delay required for the cups to separate. The details of the suction cup 215 and the adjustable means for controlling the flow of air into the cup are not shown here, for the reason that this art is well-known and various ways are illustrated in the published patents for controlling the same. For example, in the above-mentioned patent to Birr, there is shown in detail a valve-control structure substantially like the one here illustrated.

The lower edge 220 of the time-stop plate is curved and has formed thereon a relatively-short protruding thread-following tab 221, this tab being best seen in FIGS. 10, 11, and 12. Forwardly of the tab 221 and the stop latch 209 (the latter of which is on the back side of the plate 208), the stop plate 208 has rotatably mounted thereon, as by a pin 222, a cam-following roller 223. Inwardly of the plate 208 there is a coiled tension spring 224 which has its upper end suitably secured to the upper portion of the plate, or to the flange 210, thereof well ahead of the position of the pivot pin 205, the lower end of the spring 224 being secured, as by a screw 225, to the mechanism side plate 91. Thus, it will be understood that the spring 224 tends to cause the stop plate 205 to pivot in the counterclockwise direction, as seen in FIG. 7. The rear edge of the stop plate 208, below the finger 213, has formed thereon a second finger 226 (see FIGS. 7 and 9) which extends laterally inwardly, the extremity of the finger 226 having a forwardly-directed flange 227 formed thereon, which very loosely and slidably hooks or latches across the adjacent curved rear edge 91a of the mechanism side plate 91. Because of the inward position in which the spring 224 is mounted, it will thus be appreciated that, in addition to tending to cause the stop plate 208 to pivot in the counterclockwise direction about the pin 205, the spring tends to pivot the plate, in a "wobble" or tilting fashion about a line 228 (see FIG. 7) extending from the finger 226 through the axis of the pin 205. Because the spring 224 is inwardly of the plate 208, it will be seen that the spring 224 tends to "wobble" or tilt the plate 208 about the line 228 in a direction such that the lower edge 220 of the plate will tend to be moved in a direction from the mechanism side plate 91 outwardly toward the cam member 203.

Thus, by virtue of the action of the spring 224 and the pivotal and tilting or "wobbling" motion permitted of the plate 208, the normal position of the plate 208 (shown in solid lines in FIG. 9 and by phantom lines in FIG. 8) is such that the cam-following roller 223 rides on the cam 203. When the dispensing mechanism is in its normal condition, following the completion of a drying operation, the parts of the time-stop mechanism just described are in the position shown in FIGS. 7 and 9 and by the phantom lines in FIG. 8. In this position, the cam-following roller 223 rests on the low surface 204 of the cam 203, so that the stop plate 208 is pivoted in the counterclockwise direction (as viewed in FIG. 7), with the suction cups 214 and 215 separated. The counterclockwise pivotal position has likewise withdrawn the thread-following tab 221 from engagement with the threads 202 of the stop lead member 201. However, when the user of the dispensing mechanism starts to pull outwardly and downwardly on the clean toweling adjacent the front of the cabinet, the rotation of the measuring roll 101 causes the cam member 203 to rotate in the direction of the arrow shown thereon in FIG. 7, thus causing the high surface 204a of the cam to raise the cam follower wheel 223, thereby to pivot the stop plate 208 in a clockwise direction, as viewed in FIG. 7. This pivotal motion of the stop plate 208 immediately causes the suction cup 214 to be moved downwardly into pressed contact with the lower suction cup 215. The mated suction cups thereupon retain the stop plate 208 in its pivotally-displaced condition, until the cups time out and separate, even though the high surface 204a of the cam 203 subsequently disengages the follower wheel 223. This initial pivotal movement of the plate 208 also causes the thread-following tab 221 to engage the threads 202 of the stop-lead member 201, as will be more fully explained hereinafter.

If it is desired that a maximum of 10 inches of clean toweling may be dispensed upon each operation of the present dispenser, the measuring roll 101 may be two and one-half inches in circumference, and four threads 202 may be employed on the stop-lead member 201. Thus, when the user begins his pull on the clean toweling, the cam 203 will rotate with the measuring roller 101, the high surface 204a of the cam will promptly pivot the stop plate 208 in the clockwise direction (as viewed in FIG. 7), thereby engaging the suction cups 214 and 215 and simultaneously engaging the thread-following tab 221 with the beginning or outermost thread 202. As the user continues to withdraw clean toweling, the measuring roll 101 and the stop-lead member 201 will continue to be rotated, thereby causing the thread-following tab 221, and thus the plate 208, to follow the threads 202, thus causing the plate 208 progressively to tilt about the line 228, the lower portion of the plate 208 accordingly being carried in a direction from the cam 203 toward the mechanism side plate 91. If four threads 202 are used, as just suggested, as the measuring roll 101 completes its fourth revolution and completes the 10 inch withdrawal of toweling, the lower-edge portion of the plate 208 and its tab 221 will have been led to the fourth thread, whereupon the stop dog 200, which has been rotating along with the stop-lead member 202, will come into stopping contact with the lower edge 209a of the stop latch 209, thus halting the rotation of the measuring roll 101 and preventing the withdrawal of further clean toweling from the dispenser. The user may then dry his hands on the withdrawn toweling, and, in normal operation, the suction cups will then time out and separate, thereupon permitting the spring 224 to pivot the plate 208 in the counterclockwise direction about the pin 205 and to tilt the plate about the line 228, thereby causing the stop plate 208 to return to its original position preparatory to another operation.

By virtue of the construction just described, it will, of course, be appreciated that, if the user does not withdraw the full permitted amount of toweling, but stops the withdrawal when only a small amount of clean toweling has been withdrawn, the lower edge 209a of the stop latch 209 will not reach a position in which it will be engaged by the stop dog 200 and no stopping action will occur. Nevertheless, when the suction cups 214 and 215 time out and part, the plate 208 will automatically be returned to its original position by the action of the spring 224, thereby permitting a fully prescribed amount of toweling to be withdrawn on the next operation.

The pad 212 on the upper portion of the upstanding plate 211 on the stop plate 208 cooperates with the lower end of an upstanding push rod 240 (FIGS. 6 and 7). This rod 240 is loosely contained, adjacent its lower end, in an opening provided in a horizontal flange 241 of an L-shaped member that is welded or otherwise secured to the outside of the mechanism support plate 91. Adjacent the upper end of the rod 240 there is an L-shaped member 242 welded or otherwise secured to the outer surface of the mechanism side plate 91, thereby providing a laterally extending flange 243 which has a slot 244 (FIG. 6) formed therein and loosely receiving the upper portion of the rod 240. If desired, the rod 240 may have a nylon stop collar 244 or the like (see FIG. 6) press-fitted thereon at a position below the flange 243 to prevent the rod 240 from momentarily being bumped too high when the vacuum cups 214 and 215 separate and the stop plate 208 is quickly pivoted in the counterclockwise direction by the spring 224 as previously described.

The uppermost end of the push rod 240 cooperates with the underside of a laterally extending flange 245 which is formed on the forward end of a brake lever 246. This brake lever 246 is best seen in FIG. 6 and it has an integral finger 247 extending diagonally upwardly therefrom. The upper end of the finger 247 is pivotally mounted, as by a pin 248, upon the inner surface of the right-hand inner wall plate 31 of the cabinet. The brake lever 246 extends rearwardly to a position below the brake roller 57, it being understood that the lever 246 pivotally lies closely adjacent the side plate 31 so as not to interfere with the link 62a or the link 60a. At its rear end, the brake lever 246 has a laterally turned flange 249 formed thereon which extends from the body of the lever toward the center interior of the cabinet. This flange 249 has a pair of upstanding ears 250 and 251 formed thereon (see FIG. 6A), with each of the ears having a diagonally disposed elongated slot 252 formed therein. A small brake wheel 253 is located between the upstanding ears 250 and 251 and is provided on its opposite sides with trunnions 254 which ride in the two slots 252. The wheel 253 may be of rubber or the like and its diameter is such that the periphery of the wheel may be out of contact with the upper surface of the flange 249 between the ears 250 and 251 when the trunnions 254 of the wheel are in the upper ends of the slots 252. The diameter of the wheel 253, furthermore, is such, that the periphery thereof will come into frictional contact with the upper surface of the flange 249, between the ears 250 and 251, when the trunnions 254 are at a lower position in the slots 252.

The towel brake roller 57 may have towel guide collars 57a provided thereon (see FIG. 4) and the surface of the brake roller 57 between the two guide collars 57a is preferably coated with granular material, such as a sand-containing paint, so as to tend to prevent the toweling from slipping with respect to the surface of the brake roller. With attention being directed to FIGS. 4, 6 and 6A, it will be seen that the right-hand end of the brake roller 57 has fixedly secured thereon a brake collar 57b, of soft rubber or the like, which is disposed directly above the brake wheel 253 and is arranged to cooperate therewith.

In its normal condition, the push rod 240 is in the raised position shown in FIG. 7, with the stop 244 either in contact with or disposed closely adjacent the underside of the guide flange 243. This elevated position of the rod 240 (FIG. 1) causes the upper end of the rod to push upwardly on the flange 245 of the brake arm 246, thereby pivoting the brake arm 246 in a counterclockwise direction (as viewed in FIG. 6), thereby to disengage the brake wheel 253 from the peripheral surface of the brake collar 57b on the towel brake roller 57. In this condition, the brake roller 57 is free to rotate in either direction about its trunnions, the latter of which are rotatably carried in the slots 56 and 56a in the respective mechanism support brackets 50 and 50a. However, when the time stop plate 208 is pivoted in its clockwise direction to engage the suction cups 214 and 215, as previously explained, the push rod 240 drops and disengages the underside of the flange 245 of the brake arm 246, as illustrated in FIG. 6. The weight of the end of the brake arm 246 to the right of the pivot pin 248 (as viewed in FIG. 6) thereupon causes the brake arm to pivot in a clockwise direction to bring the brake wheel 253 upwardly into contact with the brake collar 57b of the towel brake roller 57. This contact causes the brake wheel 253 and its trunnions 254 to slide downwardly along the slots 252 until the lower surface of the brake wheel 253 is in contact with the upper surface of the flange 249. If desired, a small tension spring 255, having one of its ends connected to the brake arm 246 and its other end fixed to the side plate 31, may be used to insure that the clockwise pivotal motion of the brake arm 246 just referred to positively takes place when the push rod 240 is lowered. In any event, with the brake wheel 253 in contact with both the brake collar 57b on the brake roller 57 and with the upper surface of the flange 249 between the ears 251 and 250, it will be understood that the brake wheel 253 serves as a one way clutch or brake with respect to the towel brake roller 57. Thus, in the condition best illustrated in FIGS. 6 and 6A, the brake wheel 253 will permit the brake roller 57 to rotate in the direction of the arrow 260 but will prevent rotation of the brake roller in the direction of the arrow 261. This will be easily understood for the reason that rotation of the brake roller 57 in the direction of the arrow 260 will rotate the brake wheel 253 in a direction causing the latter to tend to roll up the upper surface of the flange 249, thus causing the wheel 253 to move upwardly in the slots 252 and thereby tend to disengage the periphery of the wheel 253 from the upper surface of the flange 249. On the other hand, if the brake roller 57 tends to rotate in the direction of the arrow 261, the brake wheel 253 is caused to roll down the upper surface of the flange 249, thereby moving the trunnions 254 down the slots 252 to cause the lower periphery of the wheel 253 to bear against and frictionally bind against the upper surface of the flange 249. This frictional binding action stops the rotation of the wheel 253 and thus applies a braking force upon the brake collar 57b to halt the rotation of the brake roller 57 in the direction of the arrow 261. As will be hereinafter explained, this braking action is utilized to prevent rotation of the towel brake roller 57 in the direction which would permit the links 62 and 62a and their rollers 71 and 72 from dropping and retracting the toweling loop, during the timed period determined by the engagement of the suction cups 214 and 215, during which period the user of the toweling may be drying his hands.

The various states and condition of the dispensing mechanism, during different stages of the operating cycle thereof, have previously been referred to herein, but, for the sake of clarity, they may be in part repeated hereinbelow, in the description of the complete cycle of operation which follows.

The dispenser, in its at-rest condition, preparatory to a dispensing operation, has its towel retraction and storage links 62 and 62a, and the rollers 71 and 72, approximately in the position thereof shown in FIG. 14 or slightly below that position. The links 62 and 62a are held in this position by the fact that the toweling is in a stationary condition and is stretched more or less (from the soiled towel roll 171, under the roll 72, upwardly over the intermediate roller 58, downwardly under the roller 71, and thence upwardly over the towel brake roller 57) by the weight of the links 62 and 62a and their rollers 71 and 72. In this condition, the links 62 and 62a and the rollers 71 and 72, by reason of their weight, hold the toweling loop 41c upwardly in the channel 36, as previously explained. In this condition, all soiled toweling is hidden from the normal view of a potential user, so that the user, when he begins a dispensing operation, will have no tendency to grip a soiled towel portion. With the dispenser in this normal at-rest condition, it will also be remembered that the time-stop mechanism will be in the condition illustrated in FIGS. 7 and 9, and in FIGS. 10 and 14. The cam-follower roller 223 will be at rest on the lower surface 204 of the cam 205, the stop dog 200 will be out of engagement with the stop latch 209 (because the stop plate 208 is tilted to its initial position about the line 228), the suction cups 214 and 215 will be out of engagement, and the thread-following tab 221 will be out of engagement with the threads 202 of the time-stop lead number 201, as best seen in FIG. 10. Furthermore, in this normal, at-rest condition, the push rod 240 will be in its uppermost position, thereby pivoting the brake arm 246 to a position wherein the brake wheel 253 is either completely out of engagement with the brake collar 57b of the towel brake roller 57, or wherein there will be no forceful contact between the two.

With the mechanism in the normal at-rest condition just explained, the next user of the dispensing mechanism approaches the front of the cabinet, grips the exposed side edges 41d and 41e of clean toweling, and pulls downwardly thereon. This downward pull accomplishes two basic things. It feeds fresh toweling from the fresh towel roll 140, around the measuring roller 101 and downwardly from the front portion of the cabinet into the forward leg 41b of the now-exposed towel loop 41c, and the downward pull on the toweling also pulls on the rear leg 41a of the loop, thereby pulling from within the rear portion of the cabinet, through the opening 40, previously-soiled toweling which elongates the rear leg 41a of the loop, thereby providing an over-all loop 41c that is of a convenient and easily-used length. This withdrawal of previously-soiled toweling from the opening 40 at the rear of the dispenser is permitted by the fact that the links 62 and 62a, and their storage and takeup rollers 71 and 72 are raised, by the pull on the toweling, from approximately the position shown in FIG. 14 or slightly therebelow, to the position shown in FIGS. 5 and 15.

The downward pull on the clean toweling also immediately sets in motion the operation of the time-stop assembly. During the first part of the pull, the rotating cam 203 causes the cam-follower roller 223 to ride up onto the high surface 204a of the cam, thereby pivoting the cam plate 208 in the counterclockwise direction, as viewed in FIGS. 7 and 11. This pivotal motion simultaneously causes the thread-following tab 221 to engage the threads 202 of the time-stop lead member 101 and causes the two suction cups 214 and 215 to be pressed together. The pressing of the cups together expels the air therebetween, so that a suction condition is produced between the cups, causing the cups to be held together and thus causing the cups to retain the stop plate 208 in its pivoted position for the time being and until they later time out and separate.

The initial pivotation of the time-stop plate 208 to engage the suction cups 214 and 215, and to engage the thread-following tab 221 with the threads 202, also causes the brake push rod 240 to be lowered, thereby permitting the brake arm 246 to pivot to bring the brake wheel 253 upwardly against the brake collar 57b of the towel brake roller 57. Thus, during the initial part of the clean towel withdrawal, the one-way brake mechanism is actuated with respect to the towel brake roll 57, so that the latter roller may rotate in the direction permitting the withdrawal of soiled toweling across the roller and out of the rear opening 40 in the cabinet, but is prevented from rotating in the opposite direction, this latter direction being the direction in which the roller 57 would rotate if the links 62 and 62a were being lowered instead of being raised.

During the continued withdrawal of the clean toweling by the user, the measuring roller 101 is rotated, with the toweling firmly held thereagainst by the rollers 152 and 157 on the inside of the cabinet door, and the rotation of the measuring roller causes the threaded time-stop lead 201 and the stop dog 200 to rotate. The rotation of the threads 202 progressively moves or tilts the thread-following tab 221 and the time-stop plate 208 from their outer position (shown by the phantom lines in FIG. 8) toward the inner end of the threads. If the user stops his withdrawal of clean toweling before the maximum permitted amount has been withdrawn and before the plate 208 has been moved or tilted to the position at which the stop dog 200 will strike the stop latch 209, no stopping action takes place, but, when the suction cups 214 and 215 subsequently time out, all parts of the mechanism will automatically be returned to their initial, normal, at-rest condition, in the manner that will hereinafter be explained, so that the next user may withdraw the maximum length of clean toweling, if he so desires.

In the normal operation of the dispenser, however, most users will withdraw from the dispensing mechanism the full permitted length of clean toweling. When the withdrawal of the maximum predetermined amount of toweling has been completed, the thread-following tab 221 and the plate 228 will have reached the position at which the stop dog 200 strikes the lower edge 209a of the stop latch 209, thereby stopping and preventing the withdrawal of any additional clean toweling from the dispenser. The time-control adjustment screw 217 is normally adjusted so as to cause a reasonable time delay to occur before the suction cups 214 and 215 will time out and separate, this time delay normally being sufficient to permit the user comfortably and without hurry to dry his hands. During these drying and timed periods the weight of the links 62, 62a and the rollers 71, 72 rests upon the toweling which is intertwined about these rollers, and the brake mechanism illustrated in FIGS. 6 and 6a prevents the towel-brake roller 57 from rotating in the direction which would permit the toweling to release and let fall the links 62 and 62a and their rollers 71 and 72. During the time when the user is drying his hands, that is, during the time when the suction cups 114 and 115 are adhered to each other, the braking action on the towel-brake roller 54 prevents the gravitational forces of the links 62, 62a and the rollers 71 and 72 from being applied to the now-depending towel loop 41c. As the result, the user does not need to hold onto the depending towel loop 41c during the timed period. On the contrary, during the time period, the depending towel loop 41c will hang freely where it may be easily and comfortably used.

It may also be repeated here that, during the actual withdrawal of fresh toweling by the user, the rotation of the measuring roll 101 also has caused the soiled towel drive roller 107 to rotate the soiled towel roll 171, whereby an amount of soiled toweling equal to the length of the fresh toweling withdrawn and previously stored around the rollers 57, 71, 58, and 72 has been rolled upon and taken up by the soiled toweling roll 171. Because of this latter action, it will be appreciated that the total length of toweling available for the loop 41c remains constant as between successive operations.

When the suction timer cups 214 and 215 time out, the spring 224 pivots the stop plate 208 in the counterclockwise direction (as viewed in FIGS. 7 and 10), the thread-follower tab 221 from the threads 202, separating the suction cups 214 and 215, and raising the brake push rod 240 to release the braking action exerted upon the towel-brake roller 57 by the brake mechanism illustrated in FIGS. 6 and 6a. At the same time, the spring 224 causes the stop plate 208 to tilt outwardly about the line 228, thereby causing the lower portion of the plate 208 to return to its normal position, thus disengaging the stop latch 209 from the stop dog 200. The time-stop mechanism will thus be restored to its normal position ready for the next operation. With the release of the braking force on the towel-brake roller 57, the links 62 and 62a are permitted to drop from their raised position, shown in FIGS. 5 and 15, to their normal position which is about half way between the top of the cabinet and the bottom thereof. This dropping of the links 62 and 62a and their rollers 71 and 72 retracts the toweling loop 41c from its use position, illustrated in FIG. 15, to its storage position, shown in FIG. 14, whereupon the dispensing mechanism in its entirety is ready for another operation.

In the event the pull on the clean toweling by the user exhausts the supply of toweling in the roll supply 140, the free end of the toweling is pulled from the front of the cabinet and dangles downwardly from the cabinet in a use position during the timed period referred to above. Upon the expiration of the timed period in that event, all of the parts of the dispenser return to their normal positions as previously explained, except for the links 62 and 62a, which will drop all the way to the bottom of the cabinet, as shown in FIG. 16, thereby pulling the entirety of the dangling free end of the toweling into the cabinet. This condition is shown in FIG. 16 and in FIG. 13, and it will be understood that the unsightly and unsanitary dangling towel-end problem is, thus, entirely overcome. The custodian of the cabinet may later reload the dispenser with fresh toweling in the fashion previously described herein.

In connection with the vertical motion of the rollers 71 and 72 on the links 62 and 62a, it is to be observed that, because of the articulated relationship between the links 62a and 60a, the links 62a and 60a, in effect, pivot about different points during their progressive vertical movement. This can perhaps best be seen from FIG. 13. As the link 62 in FIG. 13 is first raised, it will be appreciated that the pivotation of the link initially takes place about the pivot pin 63. However, as the elevation of the link 62 continues, pivotation begins effectively to occur about the pin 61, and, when the link 62 has been raised sufficiently to cause the rear edge 65 thereof to engage the flange 61 of the link 60, pivotation thereafter effectively occurs entirely about the pin 61. The same shifting of the points of pivotation occurs, of course, during the elevation of the corresponding link 62a, and the reverse takes place as the links are lowered from their elevated positions to their lowermost positions. The result of this novel arrangement is that, during most of their travel, the rollers 71 and 72 trace substantially vertical paths, with the path of the rear roller 71 being very close to or in sliding contact with the rear wall 29 of the cabinet. This permits the cabinet itself to have a minimum size with a minimum depth from front to back. At the same time, however, the links 62 and 62a, as they approach their uppermost positions, are effectively pivoted solely about the axis of the pin 61 so that the rollers 71 and 72 clear the rollers 57 and 58 and also present the roller 71 in a position substantially spaced from the back wall 29 of the cabinet so as to permit easy threading of fresh toweling thereabout. It is also for the convenience of threading fresh toweling that the roller 57 is arranged to ride in the slots 56 and 56a of the mechanism support brackets 50 and 50a. When the fresh toweling is fed upwardly behind the roller 57 during loading, that roller may be pulled upwardly and forwardly in the slots 56 and 56a, away from its normal position adjacent the back wall 29 of the cabinet, thereby permitting easy threading to the towel about the roller 57.

Numerous variations may be made in the present structure, within the scope of the appended claims. For example, in FIG. 9 an alternate form of a stop dog 200 is illustrated, that stop dog having an off-set stop surface 200a provided thereon. With the pitch of the threads being appropriate, the stop dog surface 200a will strike the lower end of the stop latch 209 when the measuring roll 101 has been rotated through a predetermined number of revolutions to measure out a predetermined length of fresh toweling. By removing and turning the dog over, however, the stop surface 200a may be set over a position equivalent to one thread pitch, as illustrated by the phantom lines in FIG. 9, thus permitting one further revolution of the towel measuring roll 101 and permitting the user to withdraw a section of toweling of a greater length. In addition, it will be appreciated that another way of varying the maximum length of toweling that may be permitted to be withdrawn from the fresh toweling roll 140 is to substitute for the stop lead member 201 that is presently illustrated, other stop lead members having different thread pitches thereon and, thus, different numbers of threads. Thus, merely by substituting stop lead members 201 having different thread pitches thereon, the length of clean toweling that may be permitted to be withdrawn may be made equal to any selected multiple of the circumference of the measuring roll 101 being used. As previously stated, a dispenser of the present kind having preferred dimensions, utilizes a measuring roll having a circumference of 2½ inches. Accordingly, with a measuring roller of that size, and merely by substituting the appropriate stop lead 201, the dispenser may be caused to permit the maximum withdrawal of 2½, 5, 7½, 10, or 12½ inches of clean toweling upon each withdrawal. For the purpose of easy removal and substitution for the lead member 201 and the cam 203, which may be integral therewith, it will be noted that the lead member 201 is shown in FIG. 7 to be removably secured to the end of the measuring roller 101 by means of a square-headed bolt 201a.

It will also be appreciated, of course, that the effective surface provided by the stop surface 209a on the stop latch 209 in the present structure may be made integral with the stop plate 208. The stop surface 209a, however, should be hardened. Since the hardening of the entire plate 208, unless carefully controlled, might tend to cause the plate 208 to warp, in the present illustration, the stop latch 209 has been shown to be a separate piece of hardened metal fixedly secured to the back of the plate 208.

Although only one preferred embodiment of the present towel dispenser has been shown in the accompanying drawings and has been described above, with certain variations, it will be understood by those skilled in the art that many additional and various modifications may be made therein which fall within the spirit and scope of the appended claims.

I claim:

1. In a towel dispenser of the continuous type having a housing with a door thereon and having a loop of toweling that extends along an exit path adjacent said door from a clean towel supply within the housing to an exposed position accessible to a user, and thence along a return path within the housing to soiled towel take-up means, the combination comprising: a measuring roller within said housing and adjacent said door for dispensing into said loop along said exit path, and into use position exteriorly of said housing, a predetermined length of clean toweling when said accessible portion of said loop is pulled by a user; a pair of rollers rotatably mounted on the inside of said door and respectively disposed above and below said measuring roller when said door closed, to insure that said toweling will at all times be in firm contact with said measuring roller and thus prevent slippage of the toweling with respect to said measuring roller; loop retraction and storage means within said housing, including a pair of spaced supports having a portion of the toweling in said return path suspended thereacross, and a weight resting upon said suspended portion of said toweling between said supports, said weight having a normal position well below said supports and normally pulling the toweling in said return path downwardly between said supports for storing therebetween and within said housing a substantial portion of said loop, said weight being raised to an elevated position by said suspended toweling and at least a part of said stored portion of said loop being withdrawn from said housing along said return path and added to the loop exteriorly of said housing in response to the pull by a user upon said accessible portion of said loop, thereby to provide exteriorly of said housing an accessible loop portion of substantial length; time delay means actuated in response to the operation of said dispensing means; and means responsive to the actuation of said time delay means for retaining said weight in its said elevated position during the timing out of said time delay means.

2. In a towel dispenser of the continuous type having housing with a door thereon and having a loop of toweling that extends along an exit path adjacent said door from a clean towel supply within the housing to an exposed position accessible to a user, and thence along a return path within the housing to soiled towel take-up means, the combination comprising: a measuring roller within said housing and adjacent said door for dispensing into said loop along said exit path, and into use position exteriorly of said housing, a predetermined length of clean toweling when said accessible portion of said loop is pulled by a user; a pair of rollers rotatably mounted on the inside of said door and respectively disposed above and below said measuring roller when said door closed, to insure that said toweling will at all times be in firm contact with said measuring roller and thus prevent slippage of the toweling with respect to said measuring roller; loop retraction and storage means within said housing, including a pair of spaced horizontally disposed towel support rollers having a portion of the toweling in said return path suspended thereacross, and a weight resting upon said suspended portion of said toweling between said support rollers, said weight having a normal position well below said support rollers and normally pulling the toweling in said return path downwardly between said support rollers for storing therebetween and within said housing a substantial portion of said loop, said weight being raised to an elevated position by said suspended toweling and at least a part of said stored portion of said loop being withdrawn from between said support rollers and from said housing along said return path and added to the loop exteriorly of said housing in response to the pull by a user upon said accessible portion of said loop, thereby to provide exteriorly of said housing an accessible loop portion of substantial length; time delay means actuated in response to the operation of said dispensing means; and brake means responsive to the actuation of said time delay means for applying a braking force to one of said support rollers during the timing out of said time delay means, thereby to prevent said last-mentioned roller from rotating in a direction that would permit said weight to retract a portion of said exteriorly disposed towel loop into said housing during the timing out of said time delay means.

3. In a towel dispenser of the continuous type having a housing with a door thereon and having a loop of toweling that extends along an exit path adjacent said door from a clean towel supply within the housing to an exposed position accessible to a user, and thence along a return path within the housing the soiled towel take-up means, the combination comprising: a measuring roller within said housing and adjacent said door for dispensing into said loop along said exit path, and into use position exteriorly of said housing, a predetermined length of clean toweling when said accessible portion of said loop is pulled by a user; and a pair of rollers rotatably mounted on the inside of said door and respectively disposed above and below said measuring roller when said door is closed, to insure that said toweling will at all times be in firm contact with said measuring roller and thus prevent slippage of the toweling with respect to said measuring roller.

4. Time stop mechanism for stopping the rotation of a roller after an associated predetermined number of revolutions thereof and for providing a time delay period between the time when a first rotation of said roller is initiated and a time when the second rotation of the roller may be started, comprising: a rotatably mounted threaded member adapted to rotate with the associated roller; thread-following means movable into and out of engagement with the threads of said threaded member; a cam mounted for rotation with said threaded member for moving said thread-following means from an original position out of engagement with said threads into engagement with the beginning end of said threads at the beginning of the rotation of said threaded member, whereby said thread-following means will move laterally along said threads during the rotation thereof; time delay means for retaining said thread-following means in engagement with said threads for a predetermined time period once said cam has moved said thread-following means into engagement with said threads; a stop surface mounted for movement with said thread-following means; a stop dog mounted for rotation with said threaded means, said stop dog being adapted to engage said stop surface to halt the rotation of said threaded member when said thread-following means has moved laterally a predetermined distance along said threads; and means for disengaging said thread-following means from said threads and said stop surface from said stop dog, and for returning said thread-following means and said stop surface to their original position, upon the timing out of said time delay means.

5. The combination set forth in claim 4, wherein said time delay means includes a pair of engageable suction cups.

6. The combination set forth in claim 4, wherein said threaded member, said cam and said stop dog rotate about a common axis.

7. The combination set forth in claim 4 wherein said thread-following means is mounted for pivotation about an axis parallel to the axis of said threaded member and also for tilting motion about a line normal to said first-mentioned axis.

8. In a towel dispenser of the continuous type having a housing and having a loop of toweling that extends along an exit path from a clean towel supply within the housing to an exposed position accessible to a user, and thence along a return path within the housing to soiled towel take-up means, the combination comprising: means including a measuring roller within said housing for dispensing into said loop along said exit path, and into use position exteriorly of said housing, a predetermined length of clean toweling when said accessible portion of said loop is pulled by a user; loop retraction and storage means within said housing, including a pair of spaced supports having a portion of the toweling in said return path suspended thereacross, and a weight resting upon said suspended portion of said toweling between said supports, said weight having a normal position well below said supports and normally pulling the toweling in said return path downwardly between said supports for storing therebetween and within said housing a substantial portion of said loop, said weight being raised to an elevated position by said suspended toweling and at least a part of said stored portion of said loop being withdrawn from said housing along said return path and added to the loop exteriorly of said housing in response to the pull by a user upon said accessible portion of said loop, thereby to provide exteriorly of said housing an accessible loop portion of substantial length; a threaded member mounted for rotation with said measuring roller; thread-following means movable into and out of engagement with the threads of said threaded member; a cam mounted for rotation with said threaded member for moving said thread-following means from an original position out of engagement with said threads into engagement with the beginning end of said threads at the beginning of the rotation of said measuring roller and said threaded member, whereby said thread-following means will move laterally along said threads during the rotation of said roller; time delay means for retaining said thread-following means in engagement with said threads for a predetermined time period once said cam has moved said thread-following means into engagement with said threads; a stop surface mounted for movement with said thread-following means; a stop dog mounted for rotation with said threaded means, said stop dog being adapted to engage said stop surface to halt the rotation of said threaded member and said measuring roller when said thread-following means has moved laterally a predetermined distance along said threads; means for disengaging said thread-following means from said threads and said stop surface from said stop dog, and for returning said thread-following means and said stop surface to their original position, upon the timing out of said time delay means; and means responsive to the movement of said thread-following means into engagement with said threads for retaining said weight in its said elevated position during the timing out of said time delay means.

9. In a towel dispenser of the continuous type having a housing and having a loop of toweling that extends along an exit path from a clean towel supply within the housing to an exposed position accessible to a user, and thence along a return path within the housing to soiled towel take-up means, the combination comprising: means including a measuring roller within said housing for dispensing into said loop along said exit path, and into use position exteriorly of said housing, a predetermined length of clean toweling when said accessible portion of said loop is pulled by a user; loop retraction and storage means within said housing, including a pair of spaced horizontally disposed towel support rollers having a portion of the toweling in said return path suspended thereacross, a pair of links pivotally mounted within said housing, a pair of arms respectively pivotally mounted upon said links, and a third roller rotatably mounted on said pivoted arms and bodily resting upon said suspended portion of said toweling between said support rollers, said third roller and said arms having a normal position well below said support rollers and normally pulling the toweling in said return path downwardly between said support rollers for storing therebetween and within said housing a substantial portion of said loop, said third roller and said arms being raised to an elevated position by said suspended toweling and at least a part of said stored portion of said loop being withdrawn from between said support rollers and from said housing along said return path and added to the loop exteriorly of said housing in response to the pull by a user upon said accessible portion of said loop, thereby to provide exteriorly of said housing an accessible loop portion of substantial length; a threaded member mounted for rotation with said measuring roller; thread-following means movable into and out of engagement with the threads of said threaded member; a cam mounted for rotation with said threaded member for moving said thread-following means from an original position out of engagement with said threads into engagement with the beginning end of said threads at the beginning of the rotation of said measuring roller and said threaded member, whereby said thread-following means will move laterally along said threads during the rotation of said roller; time delay means for retaining said thread-following means in engagement with said threads for a predetermined time period once said cam has moved said thread-following means into engagement with said threads; a stop surface mounted for movement with said thread-following means; a stop dog mounted for rotation with said threaded means, said stop dog being adapted to engage said stop surface to halt the rotation of said threaded member and said roller when said thread-following means has moved laterally a predetermined distance along said threads; means for disengaging said thread-following means from said threads and said stop surface from said stop dog, and for returning said thread-following means and said stop surface to their original position, upon the timing out of said time delay means; and means responsive to the actuation of said time delay means for retaining said third roller and said arms in their said elevated position during the timing out of said time delay means, thereby to prevent said third roller and said arms from tending to retract any portion of said exterior loop into said housing during said timing out of said time delay means.

10. In a towel dispenser of the continuous type having a housing and having a loop of toweling that extends along an exit path from a clean towel supply within the housing to an exposed position accessible to a user, and thence along a return path within the housing to soiled towel take-up means, the combination comprising: means including a measuring roller within said housing for dispensing into said loop along said exit path, and into use position exteriorly of said housing, a predetermined length of clean toweling when said accessible portion of said loop is pulled by a user; loop retraction and storage means within said housing, including a pair of spaced horizontally disposed first and second support rollers having a portion of the toweling in said return path suspended thereacross, and a weight resting upon said suspended portion of said toweling between said support rollers, said weight having a normal position well below said rollers and normally pulling the toweling in said return path downwardly between said rollers for storing therebetween and within said housing a substantial portion of said loop, said weight being raised to an elevated position by said suspended toweling and at least a part of said stored portion of said loop being withdrawn from between said rollers and from said housing along said return path and added to the loop exteriorly of said housing in response to the pull by a user upon said accesible portion of said loop, thereby to provide exteriorly of said housing an accesible loop portion of substantial length; a threaded member mounted for rotation with said measuring roller; thread-following means movable into and out of engagement with the threads of said threaded member; a cam mounted for rotation with said threaded member for moving said thread-following means from an original position out of engagement with said threads into engagement with the beginning end of said threads at the beginning of the rotation of said roller and said threaded member, whereby said thread-following means will move laterally along said threads during the rotation of said roller; time delay means for retaining said thread-following means in engagement with said threads for a predetermined time period once said cam has moved said thread-following means into engagement with said threads; a stop surface mounted for movement with said thread-following means; a stop dog mounted for rotation with said threaded means, said stop dog being adapted to engage said stop surface to halt the rotation of said threaded member and said roller when said thread-following means has moved laterally a predetermined distance along said threads; means for disengaging said thread-following means from said threads and said stop surface from said stop dog, and for returning said thread-following means and said stop surface to their original position, upon the timing out of said time delay means; a brake wheel floor; a brake wheel movably mounted in a pair of elongated slots having their longitudinal axes disposed at an acute angle with respect to said floor, whereby said brake wheel during rotation may move downwardly in said slots and into frictional and binding contact with said floor; and means responsive to the actuation of said time delay means for urging said brake wheel into contact with said first support roller during the timing out of said time delay means, thereby to move said brake wheel downwardly in said slots and into frictional and binding contact with said floor to prevent rotation of said wheel and whereby applying a braking force to said first roller preventing said last-mentioned roller from rotating in a direction that would permit said weight to retract a portion of said exteriorly disposed loop into said housing during the timing out of said time delay means.

11. In a towel dispenser of the continuous type having a housing with a door thereon and having a loop of toweling that extends along an exit path adjacent said door from a clean towel supply within the housing to an exposed position accessible to a user, and thence along a return path within the housing to soiled towel take-up means, the combination comprising: a measuring roller within said housing and adjacent said door for dispensing into said loop along said exit path, and into use position exteriorly of said housing, a predetermined length of clean toweling when said accessible portion of said loop is pulled by a user; a pair of rollers rotatably mounted on the inside of said door and respectively disposed above and below said measuring roller when said door is closed, to insure that said toweling will at all times be in firm contact with said measuring roller and thus prevent slippage of the toweling with respect to said measuring roller; loop retraction and storage means within said housing, including a pair of spaced supports having a portion of the toweling in said return path suspended thereacross, and a weight resting upon said suspended portion of said toweling between said supports, said weight having a normal position well below said supports and normally pulling the toweling in said return path downwardly between said supports for storing therebetween and within said housing a substantial portion of said loop, said weight being raised to an elevated position by said suspended toweling and at least a part of said stored portion of said loop being withdrawn from said housing along said return path and added to the loop exteriorly of said housing in response to the pull by a user upon said accessible portion of said loop, thereby to provide exteriorly of said housing an accessible loop portion of substantial length; a threaded member mounted for rotation with said measuring roller; thread-following means movable into and out of engagement with the threads of said threaded member; a cam mounted for rotation with said threaded member for moving said thread-following means from an original position out of engagement with said threads into engagement with the beginning end of said threads at the beginning of the rotation of said measuring roller and said threaded member, whereby said thread-following means will move laterally along said threads during the rotation of said roller; time delay means for retaining said thread-following means in engagement with said threads for a predetermined time period once said cam has moved said thread-following means into engagement with said threads; a stop surface mounted for movement with said thread-following means; a stop dog mounted for rotation with said threaded means, said stop dog being adapted to engage said stop surface to halt the rotation of said threaded member and said measuring roller when said threaded-following means has moved laterally a predetermined distance along said threads; means for disengaging said thread-following means from said threads and said stop surface from said stop dog, and for returning said thread-following means and said stop surface to their original position, upon the timing out of said time delay means; and means responsive to the actuation of said time delay means for retaining said weight in its said elevated position during the timing out of said time delay means.

12. In a towel dispenser of the continuous type having a housing with a door thereon and having a loop of toweling that extends along an exit path adjacent said door from a clean towel supply within the housing to an exposed position accessible to a user, and thence along a return path within the housing to soiled towel take-up means, the combination comprising: a measuring roller within said housing and adjacent said door for dispensing into said loop along said exit path, and into use position exteriorly of said housing, a predetermined length of clean toweling when said accessible portion of said loop is pulled by a user; a pair of rollers rotatably mounted on the inside of said door and respectively disposed above and below said measuring roller when said door is closed, said roller that is disposed above said measuring roller being spring-pressed thereagainst when said door is closed, said roller disposed below said measuring roller being spaced therefrom and out of contact therewith when said door is closed, to insure that said toweling will at all times be in firm contact with said measuring roller and thus prevent slippage of the toweling with respect to said measuring roller; loop retraction and storage means within said housing, including a pair of spaced supports having a portion of the toweling in said return path suspended thereacross, and a weight resting upon said suspended portion of said toweling between said supports, said weight having a normal position well below said supports and normally pulling the toweling in said return path downwardly between said support for storing therebetween and with said housing a substantial portion of said loop, said weight being raised to an elevated position by said suspended toweling and at least a part of said stored portion of said loop being withdrawn from said housing along said return path and added to the loop exteriorly of said housing in response to the pull by a user upon said accessible portion of said loop, thereby to provide exteriorly of said housing an accessible loop portion of substantial length; time delay means actuated in response to the operation of said dispensing means; and means responsive to the actuation of said time delay means for retaining said weight in its said elevated position during the timing out of said time delay means.

13. In a towel dispenser of the continuous type having a housing with a door thereon and having a loop of toweling that extends along an exit path adjacent said door from a clean towel supply within the housing to an exposed position accessible to a user, and thence along a return path within the housing to soiled towel take-up means, the combination comprising: a measuring roller within said housing and adjacent said door for dispensing into said loop along said exit path, and into the position exteriorly of said housing, a predetermined length of clean toweling when said accessible portion of said loop is pulled by a user; a pair of rollers rotatably mounted on the inside of said door and respectively disposed above and below said measuring roller when said door is closed, the axes of said measuring roller and said door mounted on said rollers lying substantially in a common plane, to insure that said toweling will at all times be in firm contact with said measuring roller and thus prevent slippage of the toweling with respect to said measuring roller; loop retraction and storage means within said housing, including a pair of spaced supports having a portion of the toweling in said return path suspended thereacross, and a weight resting upon said suspended portion of said toweling between said supports, said weight having a normal position well below said supports and normally pulling the toweling in said return path downwardly between said supports for storing therebetween and within said housing a substantial portion of said loop, said weight being raised to an elevated position by said suspended toweling and at least a part of said stored portion of said loop being withdrawn from said housing along said return path and added to the loop exteriorly of said housing in response to the pull by a user upon said accessible portion of said loop, thereby to provide exteriorly of said housing an accessible loop portion of substantial length; time delay means actuated in response to the operation of said dispensing means; and means responsive to the actuation of said time delay means for retaining said weight in its said elevated position during the timing out of said time delay means.

14. In a towel dispenser of the continuous type having a housing with a door thereon and having a loop of toweling that extends along an exit path adjacent said door from a clean towel supply within the housing to an exposed position accessible to a user, and thence along a return path within the housing to soiled towel take-up means, the combination comprising: a measuring roller within said housing and adjacent said door for dispensing into said loop along said exit path, and into use position exteriorly of said housing, a predetermined length of clean toweling when said accessible portion of said loop is pulled by a user, and a pair of rollers rotatably mounted on the inside of said door and respectively disposed above and below said measuring roller when said door is closed, said roller that is disposed above said measuring roller being spring-pressed thereagainst when said door is closed, said roller disposed below said measuring roller being spaced therefrom and out of contact therewith when said door is closed, to insure that said toweling will at all times be in firm contact with said measuring roller and thus prevent slippage of the toweling with respect to said measuring roller.

15. In a towel dispenser of the continuous type having a housing with a door thereon and having a loop of toweling that extends along an exit path adjacent said door from a clean towel supply within the housing to an exposed position accessible to a user, and thence along a return path within the housing to soiled towel take-up means, the combination comprising: a measuring roller within said housing and adjacent said door for dispensing into said loop along said exit path, and into use position exteriorly of said housing, a predetermined length of clean toweling when said accessible portion of said loop is pulled by a user, and a pair of rollers rotatably mounted on the inside of said door and respectively disposed above and below said measuring roller when said door is closed, the axes of said measuring roller and said rollers mounted on said door lying substantially in a common plane, to insure that said toweling will at all times be in firm contact with said measuring roller and thus prevent slippage of the toweling with respect to said measuring roller.

References Cited

UNITED STATES PATENTS

| | | | |
|---|---|---|---|
| 282,452 | 7/1883 | Glover | 188—82.84 |
| 1,922,845 | 8/1933 | Flack | 312—38 |
| 2,117,302 | 5/1938 | Darman | 312—38 |
| 2,125,604 | 8/1938 | Darman | 312—38 |
| 2,170,223 | 8/1939 | Sylvester | 312—38 |
| 2,172,482 | 9/1939 | Steiner et al. | 312—38 |
| 2,265,875 | 12/1941 | Simpson | 312—38 |
| 3,214,226 | 10/1965 | Bahnsen | 312—38 |

CLAUDE A. LE ROY, *Primary Examiner.*

CHANCELLOR E. HARRIS, *Examiner.*

R. P. SEITTER, *Assistant Examiner.*